US011783148B2

(12) United States Patent
Iida et al.

(10) Patent No.: US 11,783,148 B2
(45) Date of Patent: Oct. 10, 2023

(54) IMAGE FORMING APPARATUS AND METHOD FOR CONTROLLING SAME

(71) Applicant: CANON KABUSHIKI KAISHA, Tokyo (JP)

(72) Inventors: Toshihiko Iida, Ibaraki (JP); Yoshiji Kanamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/379,852

(22) Filed: Jul. 19, 2021

(65) Prior Publication Data

US 2022/0027691 A1 Jan. 27, 2022

(30) Foreign Application Priority Data

Jul. 22, 2020 (JP) ................................ 2020-125692

(51) Int. Cl.
*G06K 15/02* (2006.01)
*G06F 3/12* (2006.01)

(52) U.S. Cl.
CPC ....... *G06K 15/1807* (2013.01); *G06F 3/1204* (2013.01); *G06F 3/1243* (2013.01); *G06F 3/1258* (2013.01)

(58) Field of Classification Search
CPC ............................ G06F 3/1282; G06F 3/1254
See application file for complete search history.

(56) References Cited

U.S. PATENT DOCUMENTS

| | | | | |
|---|---|---|---|---|
| 2010/0309514 | A1* | 12/2010 | Tanaka | G06F 11/3058 358/1.15 |
| 2012/0099148 | A1* | 4/2012 | Tokura | G06F 3/1284 358/1.15 |
| 2016/0039234 | A1 | 2/2016 | Hirai | |
| 2019/0138252 | A1* | 5/2019 | Okada | G06F 3/1253 |
| 2019/0303078 | A1* | 10/2019 | Miyagi | G06F 3/1285 |

FOREIGN PATENT DOCUMENTS

| | | | |
|---|---|---|---|
| JP | 2006205402 | A | 8/2006 |
| JP | 2015003476 | A | 1/2015 |

* cited by examiner

*Primary Examiner* — King Y Poon
*Assistant Examiner* — Michael L Burleson
(74) *Attorney, Agent, or Firm* — Canon U.S.A., Inc. I.P. Division

(57) ABSTRACT

An image forming apparatus receives a print job. If the print job includes instruction information for giving an instruction on a sheet setting for a sheet feed unit, the image forming apparatus makes the sheet setting for the sheet feed unit based on the instruction information. The image forming apparatus executes printing based on the print job.

6 Claims, 34 Drawing Sheets

| | |
|---|---|
| OS | 401 |
| DATA TRANSMISSION AND RECEPTION PROGRAM | 402 |
| COPY FUNCTION PROGRAM | 403 |
| SCAN FUNCTION PROGRAM | 404 |
| PDL FUNCTION PROGRAM | 405 |
| JDF FUNCTION PROGRAM | 406 |
| BOX FUNCTION PROGRAM | 407 |
| HOLD FUNCTION PROGRAM | 408 |
| UI FUNCTION PROGRAM | 409 |
| MEDIUM MANAGEMENT PROGRAM | 410 |
| JOB MANAGEMENT PROGRAM | 411 |

FIG.7B 711 710

```
<?xml version="1.0" encoding="UTF-8" standalone="no"?>
<JDF xmlns="http://www.CIP4.org/JDFSchema_1_1"Activation="Active"Category="DigitalPrinting"DescriptiveName="test"
  ICSVersions="IDP_L1-1.0 Base_L1-1.0"ID="ID01"JobID="JobID01"JobPartID="JobPartID01"MaxVersion="1.5"Status="Ready"Type="Combined"
  Types="LayoutPreparation imposition Interpreting Rendering DigitalPrinting"Version="1.5">
 <ResourcePool>
  <RunList Class="Parameter" ID="IDRL" PartIDKeys="Run" Status="Available">
   <RunList Run="0">
    <LayoutElement>
     <FileSpec MimeType="application/pdf" URL="cid:contents01"/>
    </LayoutElement>
   </RunList>
  </RunList>
  <LayoutPreparationParams Class="Parameter" ID="IDLPP" Sides="OneSidedFront" Status="Available"/>
  <ColorantControl Class="Parameter" ID="IDCC" Status="Available"/>
  <InterpretingParams Class="Parameter" ID="IDIP" Status="Available"/>
  <RenderingParams Class="Parameter" ID="IDRP" Status="Available"/>
  <DigitalPrintingParams Class="Parameter" ID="IDDPP" Status="Available">
   <MediaRef rRef="MED_000"/>
  </DigitalPrintingParams>
  <Component Class="Quantity" ComponentType="FinalProduct" ID="IDC_DPP" Status="Unavailable"/>
  <Media Class="Consumable" ID="MED_000" Status="Available"
  DescriptiveName="paper1"MediaTypeDetails="Labels"Weight="250"Dimension="842 595"AssignMedia="true">
   <Location LocationName="Tray-1"/>
  </Media>
 </ResourcePool>
 <ResourceLinkPool>
  <LayoutPreparationParamsLink CombinedProcessIndex="0" Usage="Input" rRef="IDLPP"/>
  <RunListLink CombinedProcessIndex="0 1" Usage="Input" rRef="IDRL"/>
  <ColorantControlLink CombinedProcessIndex="2 4" Usage="Input" rRef="IDCC"/>
  <InterpretingParamsLink CombinedProcessIndex="2" Usage="Input" rRef="IDIP"/>
  <RenderingParamsLink CombinedProcessIndex="3" Usage="Input" rRef="IDRP"/>
  <DigitalPrintingParamsLink CombinedProcessIndex="4" Usage="Input" rRef="IDDPP"/>
  <ComponentLink Amount="1" CombinedProcessIndex="4" Usage="Output" rRef="IDC_DPP"/>
  <MediaLink CombinedProcessIndex="4" Usage="Input" rRef="MED_000"/>
 </ResourceLinkPool>
</JDF>
```

712 (ResourcePool), 713 (DigitalPrintingParams), 714 (MediaRef), 715 (Media), 716 (Dimension), 717 (AssignMedia), 718 (Location)

```
<Media Class="Consumable" Dimension"842 595" ID="MED_000" Status="Available" AssignMedia="true">
 <GeneralID IDUsage="DeviceProductID" IDValue="10"/>
 <Location LocationName="Tray-1"/>
</Media>
```

720 (Media), 721 (GeneralID), 718 (Location), 717 (AssignMedia)

| Feature name (801) | JDF attribute (802) | Association (803) |
|---|---|---|
| Name | DescriptiveName | Use specified value (converted into character code as appropriate) |
| Grammage | Weight | Use specified value |
| Size | Dimension | Use specified value converted in unit |
| Surface property | (See appended table) | Convert specified value into feature value management by medium management program |
| Shape | (See appended table) | Convert specified value into feature value management by medium management program |
| Color | MediaColorName | Convert specified value into feature value management by medium management program |

FIG.8B 810, 811, 812, 813, 814

| | | JDF attributes and attribute values (812) | | | |
|---|---|---|---|---|---|
| | | Opacity | Texture | BackCoatings FrontCoatings | MediaType |
| Surface property feature values (811) | Film | Translucent | — | — | — |
| | Embossed | — | Embossed | — | — |
| | Vellum | — | Vellum | — | — |
| | Cotton | — | Cotton | — | — |
| | One-sided matte coated | — | — | Matte, None | — |
| | Two-sided matte coated | — | — | Matte, Matte | — |
| | One-sided coated | — | — | Coated, None | — |
| | Two-sided coated | — | — | Coated, Coated | — |
| | Postcard | — | — | — | PostCard |
| | High quality paper | — | — | — | — |

FIG.8C 820, 821, 822, 823, 824

| | | JDF attributes and attribute values (822) | |
|---|---|---|---|
| | | MediaTypeDetails | HoleType |
| Shape feature values (821) | Index paper | TabStock | — |
| | Envelope | Envelope | — |
| | Letterhead | Letterhead | — |
| | Punched paper | — | S-generic |
| | Normal | — | — |

| Sheet feed unit (901) | JDF attribute "LocationName" attribute value (902) |
|---|---|
| Main body left cassette 223a | Tray-1 |
| Main body right cassette 223b | Tray-2 |
| Sheet feed deck upper stage 223c | LargeCapacity-1 |
| Sheet feed deck middle stage 223d | LargeCapacity-2 |
| Sheet feed deck lower stage 223e | LargeCapacity-3 |

```
MIME-Version: 1.0
Content-Type: multipart/related; boundary=BoundaryString0001

--BoundaryString0001
Content-Type: application/vnd.cip4-jmf+xml
Content-ID: contentJMF
Content-Transfer-Encoding: 8bit
```
*1101*

```
<?xml version="1.0" encoding="utf-8"?>
<JMF xmlns="http://www.CIP4.org/JDFSchema_1_1" xmlns:xsi="http://www.w3.org/2001/XMLSchema-instance"
DeviceID="Printer001" SenderID="Printer001" TimeStamp="2020-04-13T16:57:21+09:00" Version="1.5" MaxVersion="1.5"
ICSVersions="Base_L0-1.0 JMF_L1-1.3 IDP_L1-1.0 Base_L0-1.3 JMF_L2-1.3 Base_L2-1.3 Base_L1-1.3 Base_L1-1.0">
  <Command ID="ID2020041316572" Type="ReturnQueueEntry" Time="2020-04-23T20:23:47+09:00" xsi:type="CommandReturnQueueEntry">
    <ReturnQueueEntryParamsAborted="PrintJob1" QueueEntryID="2" URL="cid:contentJDF"/>  ---1102
  </Command>
</JMF>
```

```
--BoundaryString0001
Content-Type: application/vnd.cip4-jdf+xml
Content-ID: contentJDF
Content-Transfer-Encoding: 8bit
```
*1103*

```
<?xml version="1.0" encoding="UTF-8" standalone="no"?>
<JDF xmlns="http://www.CIP4.org/JDFSchema_1_1" Activation="Active" Category="DigitalPrinting" DescriptiveName="test"
ICSVersions="IDP_L1-1.0 Base_L1-1.0" ID="PrintJob1" JobID="JobID01" JobPartID="JobPartID01" MaxVersion="1.5" Status="Ready"
Type="Combined" Types="LayoutPreparation Imposition Interpreting Rendering DigitalPrinting" Version="1.5">
...
  <Media Class="Consumable" ID="MED_000" Status="Available"
   DescriptiveName="paper1" MediaTypeDetails="Labels" Weight="250" Dimension="842 595" AssignMedia="true">
    <Location LocationName="Tray-1"/>
  </Media>
  <AuditPool>                                                                             ---1104
    <Notification Class="Fatal" Type="Error" TimeStamp="2020-04-23T21:01:35+09:00">    ---1105
      <Comment Language="en" Name="Description">
        Could not register media type because the database was full. ; MediaID="MED_000"
      </Comment>
      <ErrorElementErrorID="10004"/>  ---1107              1106
    </Notification>
  </AuditPool>
</JDF>
--BoundaryString0001--
```

FIG.11B 1121 1122 1123 1120

| Content of error | ErrorID | Error message |
|---|---|---|
| The sheet type having the specified sheet ID is not registered. | 10001 | Specified media type is not registered : Media/ID="MED_000" |
| No sheet tray is specified. | 10002 | No media location : Media/ID="MED_000" |
| The specified sheet tray is invalid. | 10003 | Invalid media location : Media/ID="MED_000" |
| The number of registered sheet types has reached its upper limit. | 10004 | Could not register media type because the database was full. : Media/ID="MED_000" |
| The name duplicates with that of an already registered sheet type. | 10005 | Could not register media type because the name is duplicated in the database. : Media/ID="MED_000" |
| The feature values are prohibited. | 10006 | Could not register media type because of a values conflict. : Media/ID="MED_000" |
| The sheet type is not settable for the sheet tray. | 10007 | Could not assign media type to the location. : : Media/ID="MED_000" |

```
MIME-Version: 1.0
Content-Type: multipart/related; boundary=BoundaryString0001

--BoundaryString0001
Content-Type: application/vnd.cip4-jmf+xml
Content-ID: contentJMF
Content-Transfer-Encoding: 8bit
                                                                         1101
<?xml version="1.0" encoding="utf-8"?>
<JMF xmlns="http://www.CIP4.org/JDFSchema_1_1" xmlns:xsi="http://www.w3.org/2001/XMLSchema-instance"
DeviceID="Printer001" SenderID="Printer001" TimeStamp="2020-04-13T16:57:21+09:00" Version="1.5" MaxVersion="1.5"
ICSVersions="Base_L0-1.0 JMF_L1-1.3 IDP_L1-1.0 Base_L0-1.3 JMF_L2-1.3 Base_L2-1.3 Base_L1-1.3 Base_L1-1.0">
  <Command ID="ID20200413165572" Type="ReturnQueueEntry" Time="2020-04-23T20:23:47+09:00" xsi:type="CommandReturnQueueEntry">
    <ReturnQueueEntryParamsCompleted="PrintJob1" QueueEntryID="2" URL="cid:contentJDF"/>  1121
  </Command>
</JMF

--BoundaryString0001
Content-Type: application/vnd.cip4-jdf+xml
Content-ID: contentJDF
Content-Transfer-Encoding: 8bit
                                                                         1103
<?xml version="1.0" encoding="UTF-8" standalone="no"?>
<JDF xmlns="http://www.CIP4.org/JDFSchema_1_1" Activation="Active" Category="DigitalPrinting" DescriptiveName="test"
ICSVersions="IDP_L1-1.0 Base_L1-1.0" ID="PrintJob1" JobID="JobID01" JobPartID="JobPartID01" MaxVersion="1.5" Status="Ready"
Type="Combined" Types="LayoutPreparationImposition Interpreting Rendering DigitalPrinting" Version="1.5">
 ...
 <Media Class="Consumable" ID="MED_000" Status="Available"
  DescriptiveName="paper1" MediaTypeDetails="Labels" Weight="250" Dimension="842 595" AssignMedia="true">
   <Location LocationName="Tray-1"/>
 </Media>
 ...
 <AuditPool>                                                              1104
  <Notification Class="Events" Type="Information" TimeStamp="2020-04-23T21:01:35+09:00">
   <Comment Language="en" Name="Description">                             1122
                                                                  1123
    Media has been registered as media type IDValue="113". : Media/ID="MED_000"
    Mediahas been assigned to Tray LocationName="Tray-1". : Media/ID="MED_000"
   </Comment>
  </Notification>
 </AuditPool>
</JDF>
--BoundaryString0001--
```

FIG.12A

Sheet database before process execution

1200

| Name | ID | Size | Surface property | Shape | Grammage |
|---|---|---|---|---|---|
| MJTR1 | 1 | A4 | High quality paper | Normal | 100 |
| MEF4S | 2 | A3 | Two-sided coated | Normal | 250 |
| KHAD2 | 3 | A4 | High quality paper | Index paper | 150 |
| FESFE3 | 4 | A3 | One-sided coated | Normal | 220 |

FIG.12B

Sheet tray settings and in-tray sheets before process execution

1201

| Sheet feed unit | Set sheet | Actual sheet |
|---|---|---|
| Main body left cassette 223a | MJTR1(ID = 1) | MEDIA_004 sheets |
| Main body right cassette 223b | MJTR1(ID = 1) | MEDIA_003 sheets |
| Sheet feed deck upper stage 223c | MJTR1(ID = 1) | MEDIA_001 sheets |
| Sheet feed deck middle stage 223d | MJTR1(ID = 1) | MJTR1(ID = 1) |
| Sheet feed deck lower stage 223e | MJTR1(ID = 1) | MJTR1(ID = 1) |

FIG.12C

Specifications in Media parts of JDF data on submitted job

1202

| ID | AssignMedia | Sheet attribute/ID | LocationName |
|---|---|---|---|
| MEDIA_001 | true | Dimension="842 595", MediaTypeDetails="TabStock" | LargeCapacity-1 |
| MEDIA_002 | Not specified | IDValue="1" | Not specified |
| MEDIA_003 | true | IDValue="4" | Tray-2 |
| MEDIA_004 | true | DescriptiveName="Film1" Dimension="842 595" Opacity="Translucent" Weight="230" | Tray-1 |

FIG.12D

Results of sheet feature determination processing in step S603
and sheet tray determination processing in step S604

1203

| ID | Sheet feature | Sheet tray |
|---|---|---|
| MEDIA_001 | Size: A4<br>Surface property: Index paper<br>Shape: Normal | Sheet feed deck upper stage 223c |
| MEDIA_003 | — | Main body right cassette 223b |
| MEDIA_004 | Name: Film1<br>Size: A4<br>Surface property: Film<br>Shape: Normal<br>Grammage: 230 | Main body left cassette 223a |

FIG.12E

Result of temporarily sheet type registration in step S608

Sheet database

1200

| Name | ID | Size | Surface property | Shape | Grammage | |
|---|---|---|---|---|---|---|
| MJTR1 | 1 | A4 | High quality paper | Normal | 100 | |
| MEF4S | 2 | A3 | Two-sided coated | Normal | 250 | |
| KHAD2 | 3 | A4 | High quality paper | Index paper | 150 | ← MEDIA_001 |
| FESFE3 | 4 | A3 | One-sided coated | Normal | 220 | ← MEDIA_003 |

Temporarily registered sheet type(s)

1204

| Name | ID | Size | Surface property | Shape | Grammage | |
|---|---|---|---|---|---|---|
| Film1 | 5 | A4 | Film | Normal | 230 | ← MEDIA_004 |

FIG.12F

Result of associations made between sheet trays and sheet types in step S611

1205

| Sheet feed unit | Set sheet |
|---|---|
| Main body left cassette 223a | Film1(ID = 5) |
| Main body right cassette 223b | FESFE3(ID = 4) |
| Sheet feed deck upper stage 223c | KHAD2(ID = 3) |
| Sheet feed deck middle stage 223d | |
| Sheet feed deck lower stage 223e | |

FIG.12G

Sheet database after registration of temporarily registered sheet types in step S613

1206

| Name | ID | Size | Surface property | Shape | Grammage |
|---|---|---|---|---|---|
| MJTR1 | 1 | A4 | High quality paper | Normal | 100 |
| MEF4S | 2 | A3 | Two-sided coated | Normal | 250 |
| KHAD2 | 3 | A4 | High quality paper | Index paper | 150 |
| FESFE3 | 4 | A3 | One-sided coated | Normal | 220 |
| Film1 | 5 | A4 | Film | Normal | 230 |

FIG.12H

Sheet tray settings and in-tray sheets after setting of sheet types for sheet trays in step S614

1207

| Sheet feed unit | Set sheet | Actual sheet |
|---|---|---|
| Main body left cassette 223a | Film1(ID = 5) | MEDIA_004 sheets |
| Main body right cassette 223b | FESFE3(ID = 4) | MEDIA_003 sheets |
| Sheet feed deck upper stage 223c | KHAD2(ID = 3) | MEDIA_001 sheets |
| Sheet feed deck middle stage 223d | MJTR1(ID = 1) | MJTR1 |
| Sheet feed deck lower stage 223e | MJTR1(ID = 1) | MJTR1 |

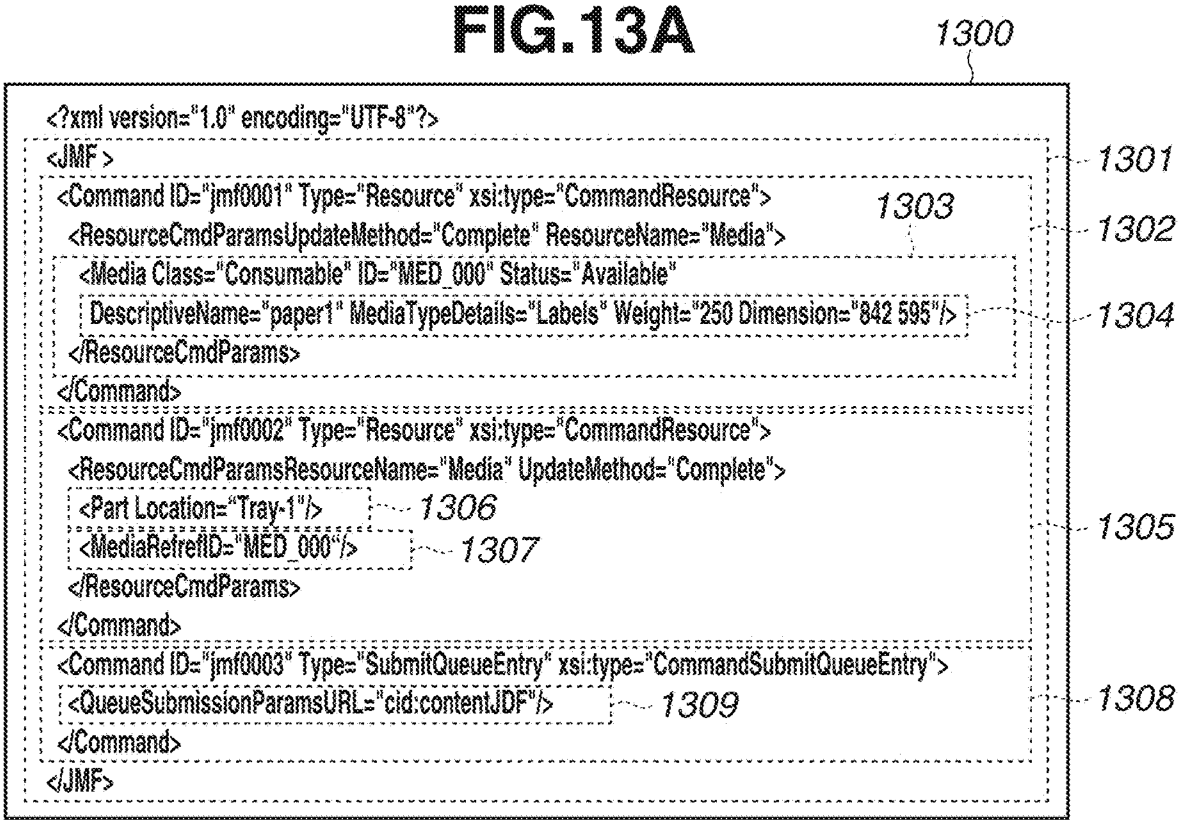

FIG.13A

```
<?xml version="1.0" encoding="UTF-8"?>
<JMF>
  <Command ID="jmf0001" Type="Resource" xsi:type="CommandResource">
    <ResourceCmdParams UpdateMethod="Complete" ResourceName="Media">
      <Media Class="Consumable" ID="MED_000" Status="Available"
        DescriptiveName="paper1" MediaTypeDetails="Labels" Weight="250 Dimension="842 595"/>
    </ResourceCmdParams>
  </Command>
  <Command ID="jmf0002" Type="Resource" xsi:type="CommandResource">
    <ResourceCmdParams ResourceName="Media" UpdateMethod="Complete">
      <Part Location="Tray-1"/>
      <MediaRefreftID="MED_000"/>
    </ResourceCmdParams>
  </Command>
  <Command ID="jmf0003" Type="SubmitQueueEntry" xsi:type="CommandSubmitQueueEntry">
    <QueueSubmissionParams URL="cid:contentJDF"/>
  </Command>
</JMF>
```

- 1301 ⟵ `<JMF>`
- 1302 ⟵ Command jmf0001
- 1303
- 1304 ⟵ Media element
- 1305 ⟵ Command jmf0002
- 1306 ⟵ `<Part Location="Tray-1"/>`
- 1307 ⟵ `<MediaRefreftID="MED_000"/>`
- 1308 ⟵ Command jmf0003
- 1309 ⟵ `<QueueSubmissionParams URL="cid:contentJDF"/>`
- 1300 overall

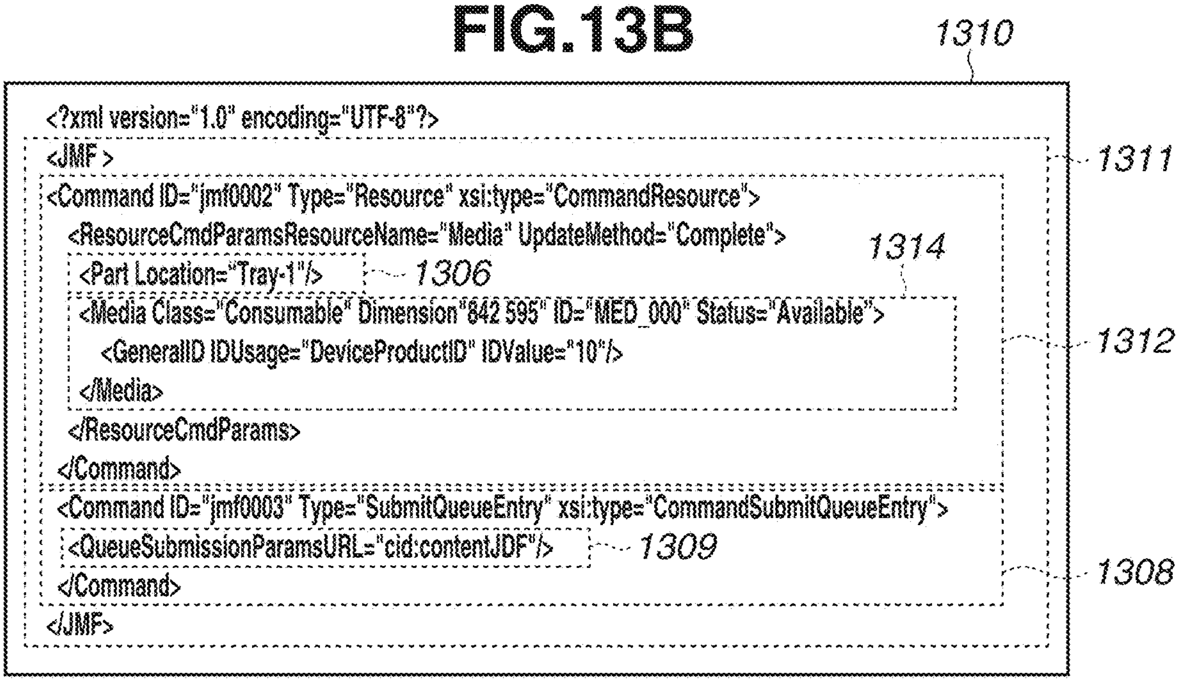

FIG.13B

```
<?xml version="1.0" encoding="UTF-8"?>
<JMF>
  <Command ID="jmf0002" Type="Resource" xsi:type="CommandResource">
    <ResourceCmdParams ResourceName="Media" UpdateMethod="Complete">
      <Part Location="Tray-1"/>
      <Media Class="Consumable" Dimension"842 595" ID="MED_000" Status="Available">
        <GeneralID IDUsage="DeviceProductID" IDValue="10"/>
      </Media>
    </ResourceCmdParams>
  </Command>
  <Command ID="jmf0003" Type="SubmitQueueEntry" xsi:type="CommandSubmitQueueEntry">
    <QueueSubmissionParams URL="cid:contentJDF"/>
  </Command>
</JMF>
```

- 1310 overall
- 1311 ⟵ `<JMF>`
- 1314
- 1312 ⟵ Media element
- 1306 ⟵ `<Part Location="Tray-1"/>`
- 1308 ⟵ Command jmf0003
- 1309 ⟵ `<QueueSubmissionParams URL="cid:contentJDF"/>`

FIG.13C 1321 1320

```
<?xml version="1.0" encoding="UTF-8" standalone="no"?>
<JDF xmlns="http://www.CIP4.org/JDFSchema_1_1"Activation="Active"Category="DigitalPrinting"DescriptiveName="test"
ICSVersions="IDP_L1-1.0 Base_L1-1.0"ID="ID01"JobID="JobID01"JobPartID="JobPartID01" MaxVersion="1.5" Status="Ready" Type="Combined"
Types="LayoutPreparation Imposition Interpreting Rendering DigitalPrinting"Version="1.5">
<ResourcePool>
  <RunList Class="Parameter" ID="IDRL" PartIDKeys="Run" Status="Available">
   <RunList Run="0">
    <LayoutElement>
     <FileSpec MimeType="application/pdf" URL="cid:contents01"/>
    </LayoutElement>
   </RunList>
  </RunList>
  <LayoutPreparationParams Class="Parameter" ID="IDLPP" Sides="OneSidedFront" Status="Available"/>
  <ColorantControl Class="Parameter" ID="IDCC" Status="Available"/>
  <InterpretingParams Class="Parameter" ID="IDIP" Status="Available"/>
  <RenderingParams Class="Parameter" ID="IDRP" Status="Available"/>
  <DigitalPrintingParams Class="Parameter" ID="IDDPP" Status="Available">     713
   <MediaRef rRef="MED_000"/>   714
  </DigitalPrintingParams>
  <Component Class="Quantity" ComponentType="FinalProduct" ID="IDC_DPP" Status="Unavailable"/>
</ResourcePool>
<ResourceLinkPool>
  <LayoutPreparationParamsLink CombinedProcessIndex="0" Usage="Input" rRef="IDLPP"/>
  <RunListLink CombinedProcessIndex="0 1" Usage="Input" rRef="IDRL"/>
  <ColorantControlLink CombinedProcessIndex="2 4" Usage="Iput" rRef="IDCC"/>
  <InterpretingParamsLink CombinedProcessIndex="2" Usage="Input" rRef="IDIP"/>
  <RenderingParamsLink CombinedProcessIndex="3" Usage="Input" rRef="IDRP"/>
  <DigitalPrintingParamsLink CombinedProcessIndex="4" Usage="Input" rRef="IDDPP"/>
  <ComponentLink Amount="1" CombinedProcessIndex="4" Usage="Output" rRef="IDC_DPP"/>
  <MediaLink CombinedProcessIndex="4" Usage="Input" rRef="MED_000"/>
</ResourceLinkPool>
</JDF>
```

Replace sheets

Load sheets as seen below and press OK button.

(1) Main body left cassette paper1

OK    Cancel

Replace sheets

Printing will automatically be started when the sheet tray is opened and closed.

(1) Main body left cassette  Not completed paper1

Cancel

Sheet tray settings and in-tray sheets before process execution

2000

| Sheet feed unit | Set sheet | Actual sheet |
|---|---|---|
| Main body left cassette 223a | MJTR1(ID = 1) | MJTR1(ID = 1) |
| Main body right cassette 223b | MJTR1(ID = 1) | MJTR1(ID = 1) |
| Sheet feed deck upper stage 223c | MJTR1(ID = 1) | MJTR1(ID = 1) |
| Sheet feed deck middle stage 223d | MJTR1(ID = 1) | MJTR1(ID = 1) |
| Sheet feed deck lower stage 223e | MJTR1(ID = 1) | MJTR1(ID = 1) |

FIG.20C

JMF/JDF specifications in submitted job 1

2002

| | ID | Sheet attribute/ID or refID | LocationName |
|---|---|---|---|
| Registration command | MEDIA_004 | DescriptiveName="Film1" Dimension="842 595" Opacity="Translucent" Weight="230" | — |
| Setting command | MEDIA_001 | Dimension="842 595", MediaTypeDetails="TabStock" | LargeCapacity-1 |
| | MEDIA_003 | IDValue="4" | Tray-2 |
| | — | refID="MEDIA_004" | Tray-1 |
| JDF sheet setting | — | refID="MEDIA_004" | Not specified |
| | — | refID="MEDIA_001" | Not specified |
| | MEDIA_002 | IDValue="1" | Not specified |

JMF/JDF specifications in submitted job 2

2003

| | ID | Sheet attribute/ID or refID | LocationName |
|---|---|---|---|
| Registration command | MEDIA_005 | DescriptiveName="Cotton1" Dimension="729 1032", Texture="Cotton" Weight="180" | — |
| Setting command | MEDIA_006 | IDValue="1" | LargeCapacity-1 |
| | MEDIA_007 | IDValue="3" | LargeCapacity-2 |
| JDF sheet setting | — | refID="MEDIA_006" | Not specified |

FIG.20D

Result of associations between sheet trays and sheet types of submitted job 1

2003

| Sheet feed unit | Association | ID |
|---|---|---|
| Main body left cassette 223a | Film1(ID = 5) | MEDIA_004 |
| Main body right cassette 223b | FESFE3(ID = 4) | MEDIA_003 |
| Sheet feed deck upper stage 223c | KHAD2(ID = 3) | MEDIA_001 |
| Sheet feed deck middle stage 223d | | |
| Sheet feed deck lower stage 223e | | |

FIG.20E

Sheet database after temporary registration processing of submitted job 2

Sheet database

1200

| Name | ID | Size | Surface property | Shape | Grammage | |
|---|---|---|---|---|---|---|
| MJTR1 | 1 | A4 | High quality paper | Normal | 100 | ← MEDIA_006 |
| MEF4S | 2 | A3 | Two-sided coated | Normal | 250 | |
| KHAD2 | 3 | A4 | High quality paper | Index paper | 150 | ← MEDIA_007 |
| FESFE3 | 4 | A3 | One-sided coated | Normal | 220 | |

Temporarily registered sheet type(s)

2004

| Name | ID | Size | Surface property | Shape | Grammage | |
|---|---|---|---|---|---|---|
| Film1 | 5 | A4 | Film | Normal | 230 | |
| Cotton1 | 6 | B4 | Cotton | Normal | 180 | ← MEDIA_005 |

FIG.20F

Results of sheet feature determination processing and sheet tray detection processing on submitted job 2

2005

| ID | Sheet feature | Sheet tray |
|---|---|---|
| MEDIA_005 | Size: B4<br>Surface property: Cotton<br>Shape: Normal | — |
| MEDIA_006 | — | Sheet feed deck upper stage 223c |
| MEDIA_007 | — | Sheet feed deck middle stage 223d |

FIG.20G

Result of associations between sheet trays and sheet types of submitted job 2

2006

| Sheet feed unit | Association | ID |
|---|---|---|
| Main body left cassette 223a | | |
| Main body right cassette 223b | | |
| Sheet feed deck upper stage 223c | MJTR1(ID = 1) | MEDIA_006 |
| Sheet feed deck middle stage 223d | KHAD2(ID = 3) | MEDIA_007 |
| Sheet feed deck lower stage 223e | | |

Result of associations of print jobs with sheet trays and sheet types

2008

| | Job association | |
|---|---|---|
| Sheet feed unit | job1 | job2 |
| Main body left cassette 223a | Film1(ID = 5) | |
| Main body right cassette 223b | | |
| Sheet feed deck upper stage 223c | KHAD2(ID = 3) | MJTR1(ID = 1) |
| Sheet feed deck middle stage 223d | | |
| Sheet feed deck lower stage 223e | | |

2009

Job state after registration in print job queue

Print job queue

| Print job 2 (ID = job3) | Print job 1 (ID = job2) | Preceding job 1 (ID = job1) |

Print waiting state 2 — Print waiting state 1 — Under printing

Job acceptance processing

2010

Job state after completion of preceding job

Print job queue

| Print job 2 (ID = job3) | Print job 1 (ID = job2) |

Print job 1 — Under printing

Job acceptance processing

FIG.20L

Sheet database after registration of sheet types of print job 1

Sheet database

2016

| Name | ID | Size | Surface property | Shape | Grammage |
|---|---|---|---|---|---|
| MJTR1 | 1 | A4 | High quality paper | Normal | 100 |
| MEF4S | 2 | A3 | Two-sided coated | Normal | 250 |
| KHAD2 | 3 | A4 | High quality paper | Index paper | 150 |
| FESFE3 | 4 | A3 | One-sided coated | Normal | 220 |
| Film1 | 5 | A4 | Film | Normal | 230 |

Temporarily registered sheet type(s)

2017

| Name | ID | Size | Surface property | Shape | Grammage |
|---|---|---|---|---|---|
| Cotton1 | 6 | B4 | Cotton | Normal | 180 |

FIG.20M

Sheet tray settings and in-tray sheets after setting of sheet trays after sheet setting of print job 1

2011

| Sheet feed unit | Set sheet | Actual sheet |
|---|---|---|
| Main body left cassette 223a | Film1(ID = 5) | Film1(ID = 5) |
| Main body right cassette 223b | MJTR1(ID = 1) | MJTR1(ID = 1) |
| Sheet feed deck upper stage 223c | KHAD2(ID = 3) | KHAD2(ID = 3) |
| Sheet feed deck middle stage 223d | MJTR1(ID = 1) | MJTR1(ID = 1) |
| Sheet feed deck lower stage 223e | MJTR1(ID = 1) | MJTR1(ID = 1) |

FIG.20N

Associations of print jobs with sheet trays and sheet types after completion of print job 1

2012

| | Job association |
|---|---|
| Sheet feed unit | job2 |
| Main body left cassette 223a | |
| Main body right cassette 223b | |
| Sheet feed deck upper stage 223c | MJTR1(ID = 1) |
| Sheet feed deck middle stage 223d | |
| Sheet feed deck lower stage 223e | |

FIG.20O

Sheet database after completion of print job 1

Sheet database

2013

| Name | ID | Size | Surface property | Shape | Grammage |
|---|---|---|---|---|---|
| MJTR1 | 1 | A4 | High quality paper | Normal | 100 |
| MEF4S | 2 | A3 | Two-sided coated | Normal | 250 |
| KHAD2 | 3 | A4 | High quality paper | Index paper | 150 |
| FESFE3 | 4 | A3 | One-sided coated | Normal | 220 |
| Film1 | 5 | A4 | Film | Normal | 230 |

Sheet tray settings and in-tray sheets after sheet setting of print job 2

2015

| Sheet feed unit | Set sheet | Actual sheet |
|---|---|---|
| Main body left cassette 223a | Film1(ID = 5) | Film1(ID = 5) |
| Main body right cassette 223b | MJTR1(ID = 1) | MJTR1(ID = 1) |
| Sheet feed deck upper stage 223c | MJTR1(ID = 1) | MJTR1(ID = 1) |
| Sheet feed deck middle stage 223d | MJTR1(ID = 1) | MJTR1(ID = 1) |
| Sheet feed deck lower stage 223e | MJTR1(ID = 1) | MJTR1(ID = 1) |

IMAGE FORMING APPARATUS AND METHOD FOR CONTROLLING SAME

BACKGROUND OF THE INVENTION

Field of the Invention

The present invention relates to an image forming apparatus capable of printing image data.

Description of the Related Art

There are various forms of operations for producing print products using printing apparatuses. In a field dealing with relatively small lot multi-product print products, such as print on demand (POD), operations are performed by managing and controlling a series of processes including order receipt, printing, and shipment using an application or system called workflow. A workflow application generates written work instructions, print jobs, delivery slips, and shipping labels based on operations accepted from customers. Operators can smoothly perform production of print products to delivery by setting up printing machines, replacing sheets, operating postprocessing apparatuses, and doing shipment work based on written work instructions that are usually output as a print product.

Among POD print products are ones produced by using a plurality of types of sheets, like personal photo books or self-publishing books. The appearance and quality of a finished book product can be improved by use of different types of sheets for the cover, inner sheets, center spreads, chapter start pages, etc. Increasing the types of sheets to be handled so that various types of sheets, including coated paper, matte paper, tab sheets, and transparent films, can be handled to meet customers' demands enables differentiation from other companies and can widen the range of orders to be received. There is therefore a strong demand for a wider choice of sheets, and printing apparatuses themselves are getting wider in the range of sheets that can be handled.

Increasing the types of sheets to be handled can help satisfy customers' detailed demands, whereas the burden on the operator doing operations according to written work instructions increases. The operator loads sheet trays with appropriate sheets according to written work instructions for each job ordered, and sets sheet types for the sheet trays by operating an operation unit of the printing apparatus. In other words, POD operations for producing a wide variety of products involves dealing with a large number of orders with different settings. This increases the number of operations for replacing sheets in the image forming apparatus, and the burden on the operator. The operations include not only loading the sheet feed units (sheet trays) with appropriate sheets but also making a notification of the types of sheets loaded in the sheet feed units by using the operation unit. This increases the operator's labor and can induce mistakes of setting a sheet type different from that of actually loaded sheets.

Japanese Patent Application Laid-Open No. 2015-3476 discusses displaying the sheet type of sheets to be used in printing a print job if the sheets are not loaded in any tray. When sheets are detected to be placed on a manual feed tray, the placed sheets are determined to be the ones to be used for the print job and the sheet setting is automatically changed. However, the method discussed in Japanese Patent Application Laid-Open No. 2015-3476 is not suitable if sheets are loaded into sheet trays according to written work instructions before a start of printing as performed in POD operations.

SUMMARY OF THE INVENTION

The present invention is directed to providing a technique that can reduce the operator's labor as to the sheet settings of the sheet feed units and prevent the occurrence of setting mistakes.

According to an aspect of the present invention, an image forming apparatus includes a reception unit configured to receive a print job, a setting unit configured to, if the print job includes instruction information for giving an instruction about a sheet setting for a sheet feed unit, make the sheet setting for the sheet feed unit based on the instruction information, and an execution unit configured to execute printing based on the print job.

Further features of the present invention will become apparent from the following description of exemplary embodiments with reference to the attached drawings.

BRIEF DESCRIPTION OF THE DRAWINGS

FIGS. 7A and 7B are schematic diagrams illustrating a configuration of print job data.

FIGS. 8A to 8C are schematic diagrams illustrating a correspondence between sheet attribute specification values and sheet features managed by a medium management program.

FIG. 9 is a schematic diagram illustrating a correspondence between sheet tray specification values and sheet feed units.

FIGS. 11A to 11C illustrate an example of data for notifying of a result of a received job.

FIGS. 12A to 12H are schematic diagrams for describing an operation according to the first exemplary embodiment.

FIGS. 13A to 13C illustrate examples of job data according to a second exemplary embodiment.

DESCRIPTION OF THE EMBODIMENTS

Exemplary embodiments of the present invention will be described in detail below with reference to the drawings.

<Description of System Configuration>

Figure 1:
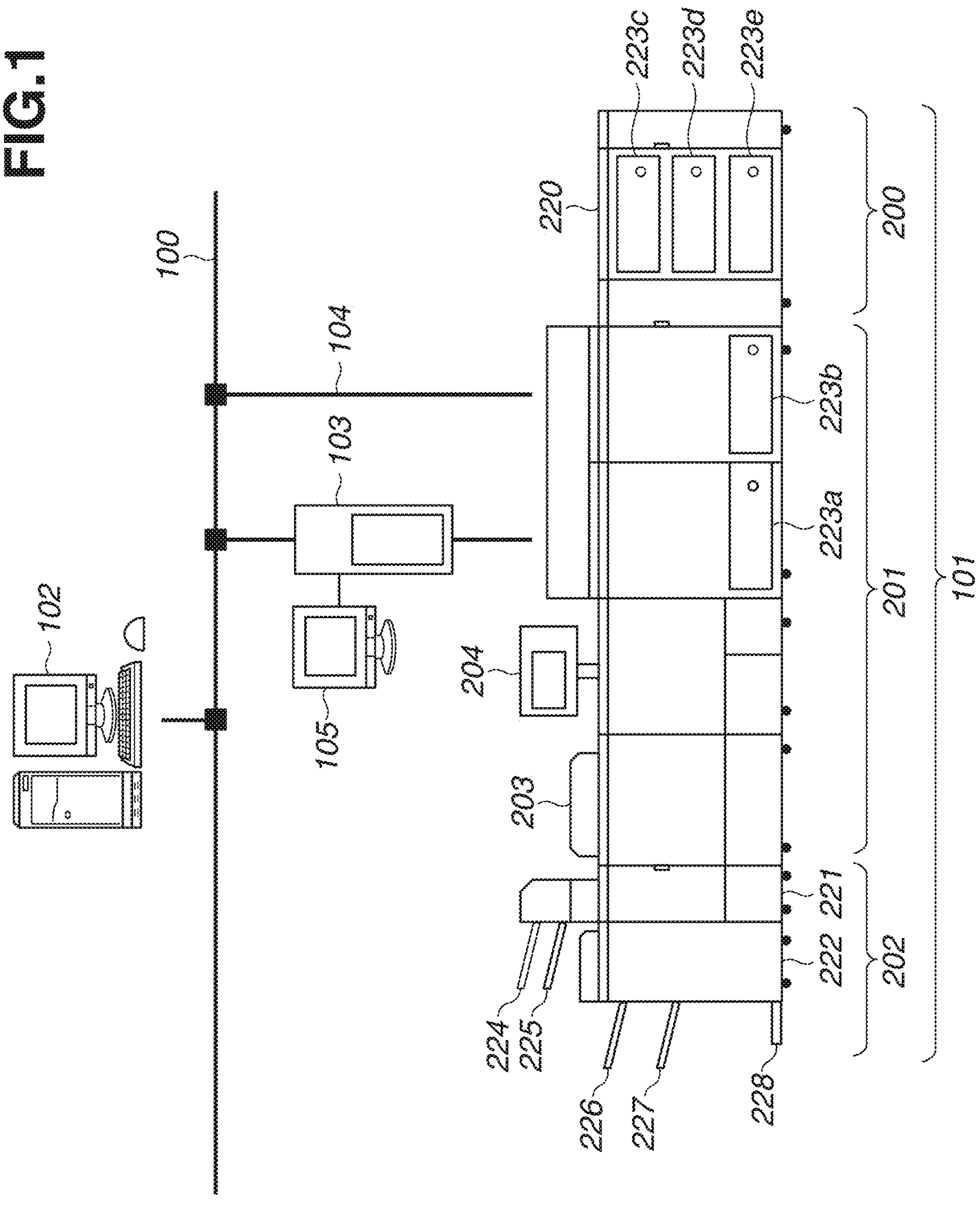
FIG. 1 is a system configuration diagram illustrating a configuration of an entire system.

FIG. 1 is a block diagram illustrating a system (print processing system) according to a first exemplary embodiment. In the present exemplary embodiment, a multifunction peripheral (MFP) 101 will be described as an example of an image forming apparatus, and an information processing apparatus 102 as an example of an information processing apparatus. The image forming apparatus 101 and the information processing apparatus 102 are communicably connected via a network 100.

FIG. 1 illustrates a case where the print processing system includes an information processing apparatus. However, the image forming apparatus 101 and a plurality of information processing apparatuses may be communicably connected via the network 100. While the print processing system according to the present exemplary embodiment includes an image forming apparatus and an information processing apparatus, this is not restrictive. For example, the image forming apparatus 101 may serve as a print processing system. Furthermore, the information processing apparatus 102 connected to the network 100 is dispensable as far as image formation processing executable only by the image forming apparatus 101, such as execution of a copy job, is concerned.

The information processing apparatus 102 will now be described. The information processing apparatus 102 can execute various programs, including an application program for submitting a job. Furthermore, a printer driver having a function of converting print data into a printer language supported by the image forming apparatus 101 is installed on the information processing apparatus 102. A user who wants to perform printing can issue print instructions from various applications. The printer driver can convert data output from the applications into print data interpretable by the image forming apparatus 101 based on the print instructions, and transmit the print data to the image forming apparatus 101 connected to the network 100.

In the present exemplary embodiment, a personal computer (PC) is illustrated as an example of the information processing apparatus 102. However, the information processing apparatus 102 may be a portable information terminal, such as a smartphone and a tablet terminal. Appropriate modifications can be made to the method for transmitting print data to the image forming apparatus 101. Print data may be transmitted to the image forming apparatus 101 via a printing application or driver. Print data may also be transmitted to the image forming apparatus 101 via a cloud server.

The image forming apparatus 101 will now be described. The image forming apparatus 101 has a reading function of reading an image on a sheet and a print function of printing an image on a sheet. The image forming apparatus 101 also has postprocessing functions of binding a plurality of image-printed sheets, aligning a plurality of sheets, and discharging a plurality of sheets to a plurality of different trays. Examples of the sheets include sheets of plain paper, sheets of thick paper, and films.

In the present exemplary embodiment, an MFP 101 is described as an example of the image forming apparatus. However, an image forming apparatus, such as a printer having no reading function, may be used. In the present exemplary embodiment, the image forming apparatus shall include various components described below, for example.

An apparatus 103 having some of the functions of the image forming apparatus 101 and/or other accessory functions may be added to the MFP. In such a case, the apparatus 103 can be regarded by the information processing apparatus 102 as providing the functions of the image forming apparatus 101 via the network 100. The apparatus 103 may be accompanied by various input/output devices similar to ones included in the information processing apparatus 102, such as a monitor 105. Even with such an accessory apparatus 103, the image forming apparatus 101 may be configured to be directly connectable to the network 100 via a network cable 104.

The image forming apparatus 101 includes a plurality of mutually-connected devices having different roles and is configured to be capable of complicated sheet processing. Each of the components of the image forming apparatus 101 will be described below.

A printer unit 201 forms (prints) an image on a sheet fed from a sheet feed unit, using toner based on image data. The configuration and operation principle of the printer unit 201 are described below.

A light beam, such as laser light, modulated based on the image data is reflected by a rotating polygonal mirror (e.g., a polygon mirror), and a photosensitive drum is irradiated with the resulting scanning light. An electrostatic latent image formed on the photosensitive drum by the laser light is developed by toner, and the resulting toner image is transferred to a sheet attached to a transfer drum. Such a series of image formation processes is performed with yellow (Y), magenta (M), cyan (C), and black (K) toners in succession to form a full color image on the sheet. The printer unit 201 may be configured to be able to transfer spot color toner and/or transparent toner in addition to the four color toners. The sheet on which the full color image is formed on the transfer drum is conveyed to a fixing device. The fixing device includes a roller and a belt. A heat source, such as a halogen heater, is built in the roller. The fixing device applies heat and pressure to melt the toner on the sheet to which the toner image is transferred, and thereby fixes the toner to the sheet.

The printer unit 201 of the image forming apparatus 101 according to the present first exemplary embodiment is equipped with a scanner unit 203 and an operation unit 204. The operation unit 204 is located on top of the printer unit 201. The operation unit 204 provides various interfaces when the user makes various settings and operations on the printer unit 201 according to the first exemplary embodiment. The image forming apparatus 101 is further configured such that various accessory devices can be attached in addition to the printer unit 201. A large-capacity sheet feeding apparatus 220 is a sheet feeding apparatus detachably attached to the printer unit 201. The large-capacity sheet feeding apparatus 220 includes a plurality of sheet feed units 223*c*, 223*d*, and 223*e*. With such a configuration, the printer unit 201 can perform print processing on a large amount of sheets. An inserter 221 is a device for use in inserting a sheet or sheets not involved in image formation into a product formed by the printer unit 201. As illustrated in FIG. 1, the inserter 221 includes two trays 224 and 225.

The image forming apparatus 101 can be broadly divided into three sections with the printer unit 201 at the center. In FIG. 1, the devices located on the right side of the printer unit 201 are called sheet feeding system devices. A primary function of the sheet feeding system devices is to continuously supply sheets loaded inside to the printer unit 201 at appropriate timing. These devices also detect the remaining amounts of sheets loaded inside. The printer unit 201 also includes sheet feed units 223*a* and 223*b*, which can perform similar functions to those of the sheet feeding system devices. For the convenience of description, the sheet feed units 223*a* and 223*b* included in the printer unit 201 will also be referred to as sheet feeding system devices.

In FIG. 1, the devices located on the left side of the printer unit 201 are called sheet processing devices or postprocessing devices. The sheet processing devices apply various types of processing to sheets on which print processing has been completed, or perform processing for stacking the sheets. In the following description, the foregoing sheet feeding system devices and the sheet processing devices will be referred to collectively as a sheet processing apparatus 200.

Figure 2:
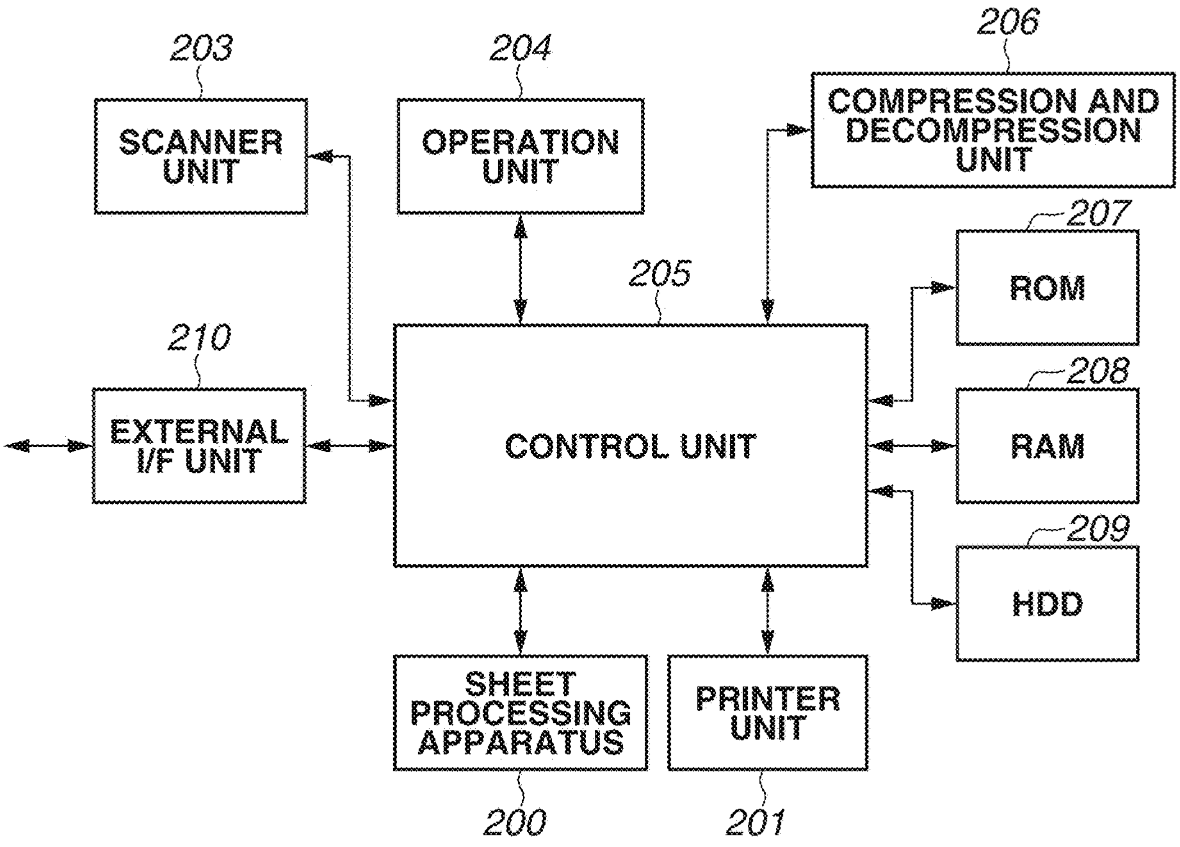
FIG. 2 is a hardware configuration diagram of an image forming apparatus.

FIG. 2 is a diagram for describing a hardware configuration of the image forming apparatus 101. The image forming apparatus 101 includes the reading function of reading an image on a sheet and the print function of printing an image on a sheet. The image forming apparatus 101 also has the postprocessing functions of binding a plurality of image-printed sheets, aligning a plurality of sheets, and discharging a plurality of sheets to a plurality of different trays. Examples of the sheets include sheets of plain paper, sheets of thick paper, and film sheets.

The image forming apparatus 101 illustrated in FIG. 2 includes a plurality of mutually-connected devices having different functions and is configured to be capable of complicated sheet processing.

The image forming apparatus 101 has a copy function of storing data accepted from the scanner unit 203 into a hard disk drive (HDD) 209, reading the data from the HDD 209, and printing the data using the printer unit 201. The image forming apparatus 101 also has a print function of storing job data received from an external apparatus via an external interface (I/F) unit 210, which is an example of a communication unit, into the HDD 209, reading the job data from the HDD 209, and printing the job data using the printer unit 201. The image forming apparatus 101 is a multifunctional processing apparatus (e.g., MFP) having such a plurality of functions. The image forming apparatus 101 may be capable of either color printing or monochrome printing.

The scanner unit 203 reads a document, performs image processing on image data obtained by reading the document, and outputs the resulting image data.

A central processing unit (CPU) included in the control unit 205 reads programs stored in a read-only memory (ROM) 207 and executes the programs, whereby the image forming apparatus 101 performs various operations according to the present first exemplary embodiment. The ROM 207 also stores a program for causing the control unit 205 to perform an operation of interpreting page description language (PDL) data received from an external apparatus via the external I/F unit 210 and developing the PDL data into raster image data (bitmap image data). Similarly, the ROM 207 also stores a program for causing the control unit 205 to interpret and process a job received from an external apparatus via the external I/F unit 210. Such programs are processed by software. The ROM 207 stores various programs in advance, including a boot sequence program, font information, and the programs described above. Details of the various programs stored in the ROM 207 will be described below. A random access memory (RAM) 208 is a readable and writable memory. The RAM 208 stores image data transmitted from the scanner unit 203 and the external I/F unit 210, various programs, and setting information.

The HDD 209 stores image data compressed by a compression and decompression unit 206. The HDD 209 is configured to be able to store a plurality of pieces of data, such as print data, on a job to be processed. The control unit 205 stores job data to be processed input via various input units, such as the scanner unit 203 and the external I/F unit 210, into the HDD 209, reads the job data from the HDD 209, and outputs the job data to the printer unit 201 for printing. The control unit 205 also controls transmission of job data read from the HDD 209 to an external apparatus via the external I/F unit 210. The control unit 205 thus performs various types of processing for outputting job data to be processed stored in the HDD 209. The compression and decompression unit 206 compresses and decompresses image data stored in the RAM 208 and the HDD 209 using various compression methods, such as Joint Bi-level Image Experts Group (JBIG) and Joint Photographic Experts Group (JPEG) compression methods. The control unit 205 also controls the operation of the sheet processing apparatus 200. The sheet processing apparatus 200 corresponds to the sheet feeding system devices and the sheet processing devices described with reference to FIG. 1.

The external I/F unit 210 transmits and receives image data to/from a facsimile, a network-connected device, and/or a dedicated external apparatus. The HDD 209 also stores various types of management information to be permanently stored, modified, and managed by the image forming apparatus 101. The image forming apparatus 101 includes the printer unit 201 that performs print processing on job data to be printed stored in the HDD 209. The image forming apparatus 101 includes the operation unit 204 having a display unit. The operation unit 204 corresponds to an example of a user interface unit. The control unit 205, which corresponds to an example of a control unit included in the image forming apparatus 101, includes the not-illustrated CPU, and controls the processing and operation of various units included in the image forming apparatus 101 in a centralized manner. The ROM 207 stores programs for performing various types of processing of flowcharts described below for the control unit 205 to perform. Various control programs used in the present first exemplary embodiment are stored in the ROM 207. The ROM 207 also stores a display control program for displaying various user interface (UI) screens on the display unit of the operation unit 204.

Figure 3:
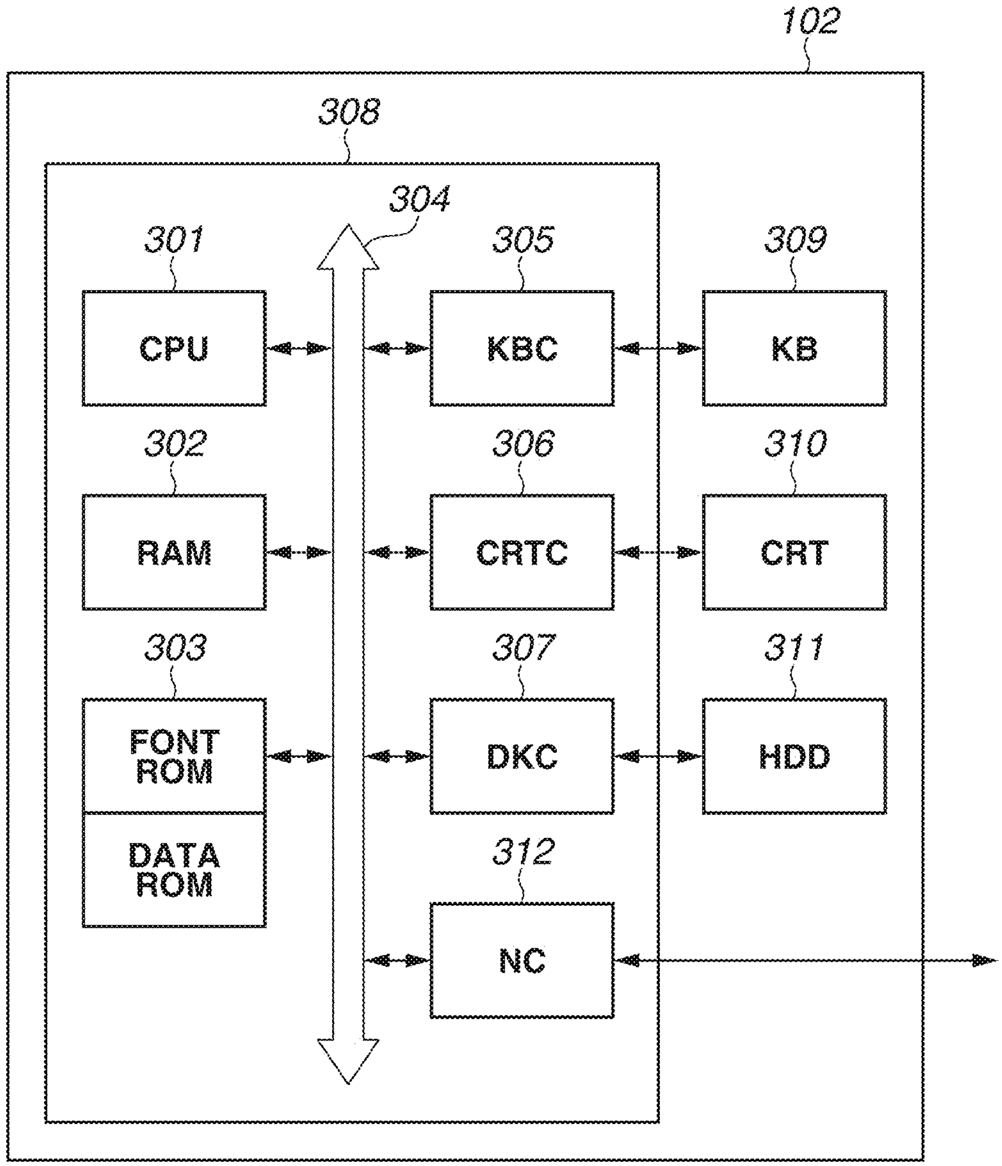
FIG. 3 is a hardware configuration diagram of an information processing apparatus.

FIG. 3 is a block diagram illustrating a configuration of the information processing apparatus (PC) 102 according to the first exemplary embodiment.

In FIG. 3, a CPU 301 executes programs stored in a program ROM in a ROM 303 or loaded from an HDD 311 into a RAM 302. The programs include an operating system (OS), general applications, and a bookbinding application. The ROM 303 also includes a font ROM and a data ROM. The RAM 302 functions as a main memory or a work area of the CPU 301. A keyboard controller (KBC) 305 controls input from a keyboard (KB) 309 and a pointing device (not illustrated). A display controller (CRTC) 306 controls display of a display unit (CRT) 310. A disk controller (DKC) 307 controls access to the HDD 311 in which a boot program, various applications, font data, and user files are stored. A network controller (NC) 312 connected to the network 100 performs communication control processing with other devices connected to the network 100. A bus 304 connects the CPU 301, the RAM 302, the ROM 303, and the various controllers, and conveys data signals and control signals.

Figure 4:
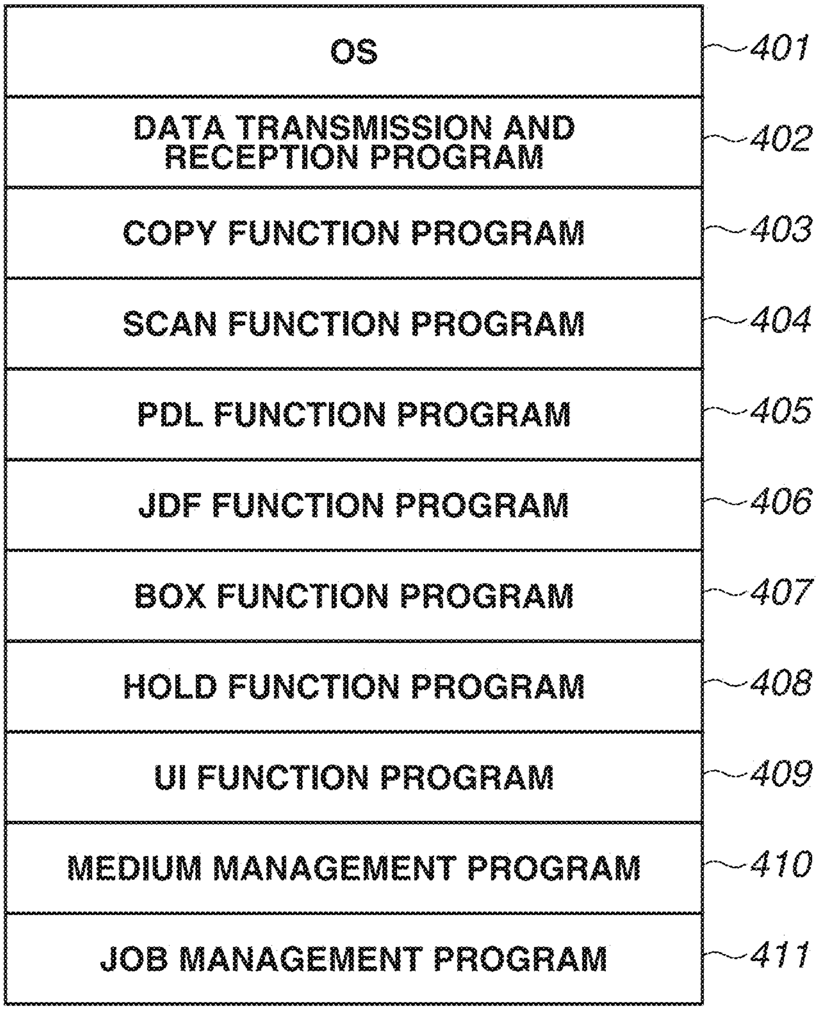
FIG. 4 is a software configuration diagram of the image forming apparatus.

FIG. 4 is a diagram for describing a software configuration of the image forming apparatus 101 according to the first exemplary embodiment. The illustrated programs are stored in the ROM 207, and read and executed by the control unit 205 included in the image forming apparatus 101.

An OS 401 is a program intended to provide an execution environment for various programs for implementing the functions of the image forming apparatus 101. The OS 401 mainly provides a function for managing resources, such as the memory of the image forming apparatus 101, namely, the ROM 207, the RAM 208, and the HDD 209, and a function for basic input/output control of the components illustrated in FIG. 2.

A data transmission and reception program 402 performs transmission and reception processing when a data input/output request occurs via the external I/F unit 210. Specifically, the data transmission and reception program 402 includes a protocol stack, such as the Transmission Control Protocol/Internet Protocol (TCP/IP), and controls communication of various types of data with external devices connected via the network 100. Communication processing to be performed here is dedicated to communication processing in a data packet transmission and reception level and communication processing by a Hypertext Transfer Protocol (HTTP) server. The communication processing does not include analysis processing about the contents of received data described below. The data analysis processing is performed by the control unit 205 based on the description of another program.

A copy function program 403 is a program for implementing the copy function to be performed by the control unit 205 based on an instruction from the operation unit 204 when the user of the image forming apparatus 101 gives the instruction via the operation unit 204. In the copy function to be performed by the control unit 205, the control unit 205 sequentially gives instructions in an appropriate order, to the resources of the image forming apparatus 101, about the operation of these devices based on processing order and processing conditions described in the copy function program 403. This eventually controls execution of the copy processing. The devices include the scanner unit 203, the printer unit 201, the sheet processing apparatus 200, the HDD 209, the compression and decompression unit 206, and the RAM 208.

A scan function program 404 is a program for implementing the scan function to be performed by the control unit 205 based on an instruction to perform the scan function from the operation unit 204 when the user of the image forming apparatus 101 gives the instruction via the operation unit 204. The control unit 205 controls devices, such as the scanner unit 203, the HDD 209, the compression and decompression unit 206, and the RAM 208, based on processing order and processing conditions described in the scan function program 404. The control unit 205 sequentially gives instructions on the operation of the devices in an appropriate order, whereby execution of scan processing is eventually controlled.

A PDL function program 405 implements a PDL function to be performed by the control unit 205 when PDL data (print job data) is received by the image forming apparatus 101 via the external I/F unit 210. The PDL function to be performed by the control unit 205 includes performing analysis processing on a specified PDL file to generate a print image. The analysis processing of the PDL file uses print setting obtained by a job definition format (JDF) function program 406 analyzing JDF job data.

The JDF function program 406 is a program for implementing a JDF function to be performed by the control unit 205 based on instructions from the external I/F unit 210 when JDF job data is received by the image forming apparatus 101 via the external I/F unit 210. The JDF function to be performed by the control unit 205 includes performing analysis processing on the received JDF job data to generate print settings for use in printing. The JDF function program 406 according to the present exemplary embodiment has a function of analyzing only a PDL part 1012 of the JDF job data to obtain a Universal Resource Locator (URL) of the PDL file. The JDF function program 406 also includes a program for performing determination processing about whether the analyzed JDF job data includes an incorrect setting or settings, and making setting changes to resolve the incorrect setting(s).

A box function program 407 implements a box function to be performed by the control unit 205 based on an instruction to perform a box function from the operation unit 204 when the user of the image forming apparatus 101 gives the instruction via the operation unit 204. In the box function, the control unit 205 performs box processing by sequentially giving instructions on the operation of devices in an appropriate order based on processing order and processing conditions described in the box function program 407. The devices include the scanner unit 203, the printer unit 201, the sheet processing apparatus 200, the HDD 209, the compression and decompression unit 206, and the RAM 208. By using the box function, settings of a job included in job data stored in the HDD 209 are changed from when the job data is stored, and the job can be executed.

A hold function program 408 is a program to be executed by the control unit 205 when the user of the image forming apparatus 101 gives an instruction to perform a hold function via the operation unit 204. The hold function is a function of storing data to be printed in the HDD 209 of the image forming apparatus 101 until a print instruction is given by the user, and then executing printing based on the data in the print instruction accepted from the user. In the hold function, the control unit 205 performs print processing in a job-holding manner by sequentially giving instructions on the operation of devices in an appropriate order based on processing order and processing conditions described in the hold function program 408. The examples of the devices include the printer unit 201, the sheet processing apparatus 200, the HDD 209, the compression and decompression unit 206, and the RAM 208. Stored job data can be executed with its settings changed from when the job data is stored.

A UI function program 409 is a program for controlling the operation unit 204. The UI function program 409 identifies the content of input made by the user of the image forming apparatus 101 via the operation unit 204, provides appropriate screen transitions, and issues processing request instructions to the control unit 205.

A medium management program 410 is a program for implementing a management function related to sheets usable by the image forming apparatus 101. Sheet-related information managed by the medium management program 410 is stored in the HDD 209.

A job management program 411 is a program for managing, as a job, a series of processes generated by the image forming apparatus 101 using programs, such as the copy function program 403, the PDL function program 405, and the JDF function program 406. The series of processes included in a job includes ones that can be executed only in limited numbers at a time, like a raster image processing (RIP) process and a print process. The job management program 411 controls the order of such processes and manages execution results (log).

Figure 5:
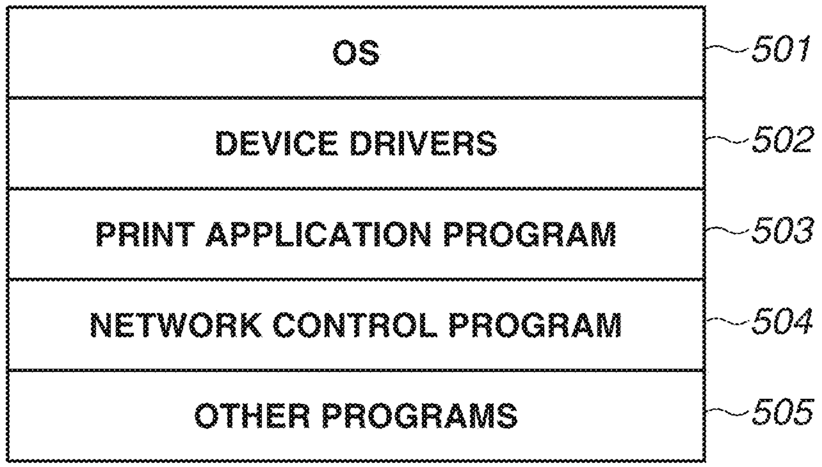
FIG. 5 is a software configuration diagram of the information processing apparatus.

FIG. 5 is a software configuration diagram of the information processing apparatus 102 according to the first exemplary embodiment.

An OS 501 is a program intended to provide an execution environment for various programs for implementing the functions of the information processing apparatus 102. The OS 501 provides a function for managing resources, such as the memory of the information processing apparatus 102, namely, the ROM 303, the RAM 302, and the HDD 311.

Device drivers 502 are programs for controlling various pieces of hardware connected to the information processing apparatus 102. The device drivers 502 include programs for controlling the KBC 305, the CRTC 306, and the DKC 307.

A print application program 503 is a generic name for programs intended to run on the information processing apparatus 102 and provide various functions and services for the user of the print processing system. The print application program 503 has a function of generating or editing print job data. The print application program 503 also has a function of converting various print specifications set on a not-illustrated setting screen of the print application program 503 into corresponding print settings. The print application program 503 further has a function of selecting a print setting file stored in the HDD 311 and generating print job data. The print application program 503 has a function of converting to a job ticket, such as PDL command format or a JDF job ticket, and generating print job data by using the job ticket itself or by combining the job ticket with the data to be printed.

A network control program 504 is a program to be executed in transmitting the print job data generated by the print application program 503 to the image forming apparatus 101 connected via the network 100. The network control program 504 can be configured to also have functions of transmitting print data and obtaining progress information about print jobs to be performed by the image forming apparatus 101 after the transmission of the print data.

Other programs 505 include a group of programs not applicable to any of the foregoing. A detailed description thereof will be omitted.

<Flowchart on Job Acceptance>

Figure 6:
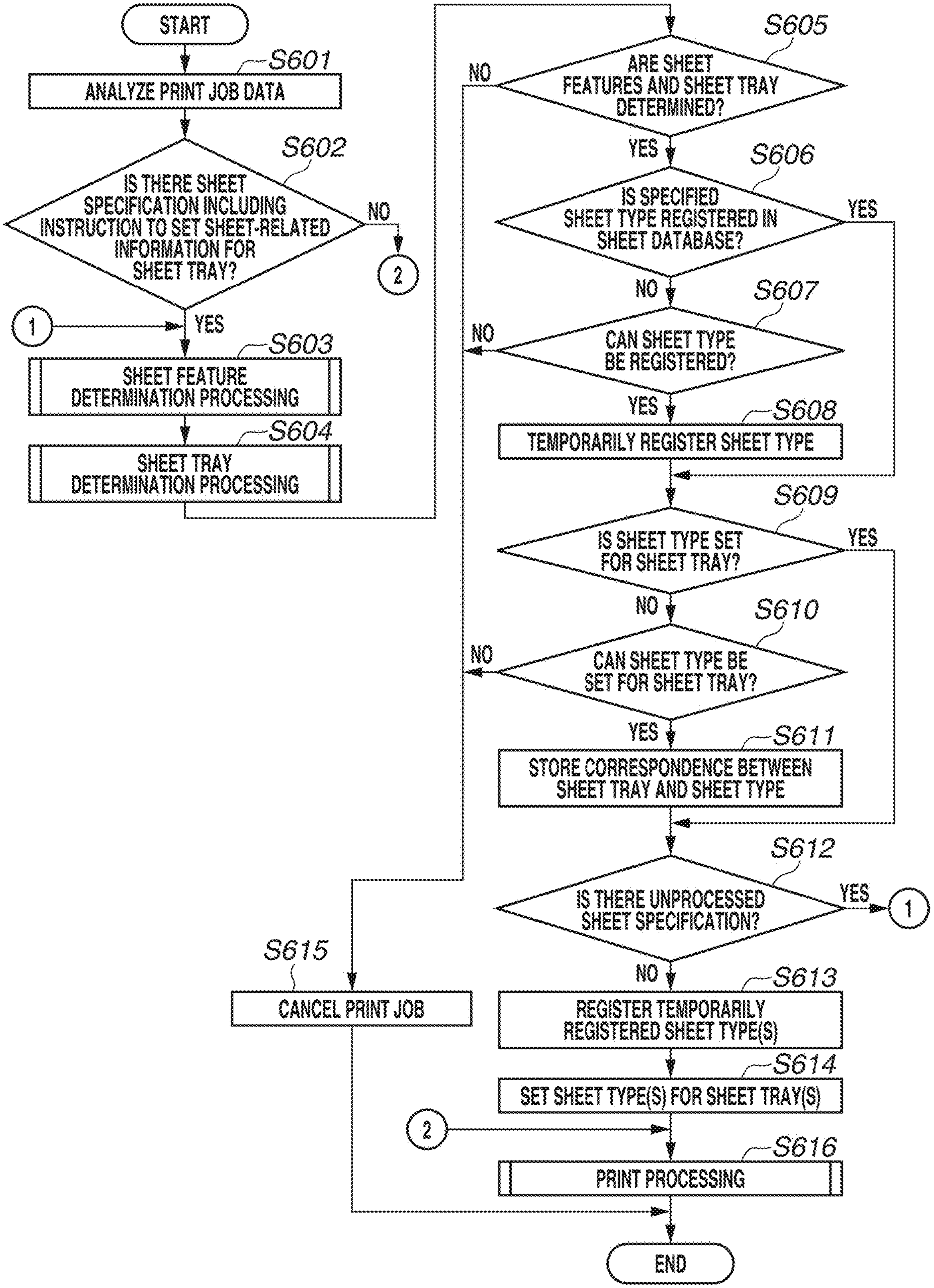
FIG. 6 is a flowchart for describing a processing procedure in accepting a job according to a first exemplary embodiment.

FIG. 6 is a flowchart of the image forming apparatus 101 upon job acceptance. The procedure starts when a job is accepted from the information processing apparatus 102 via the external I/F unit 210.

Figure 7A:
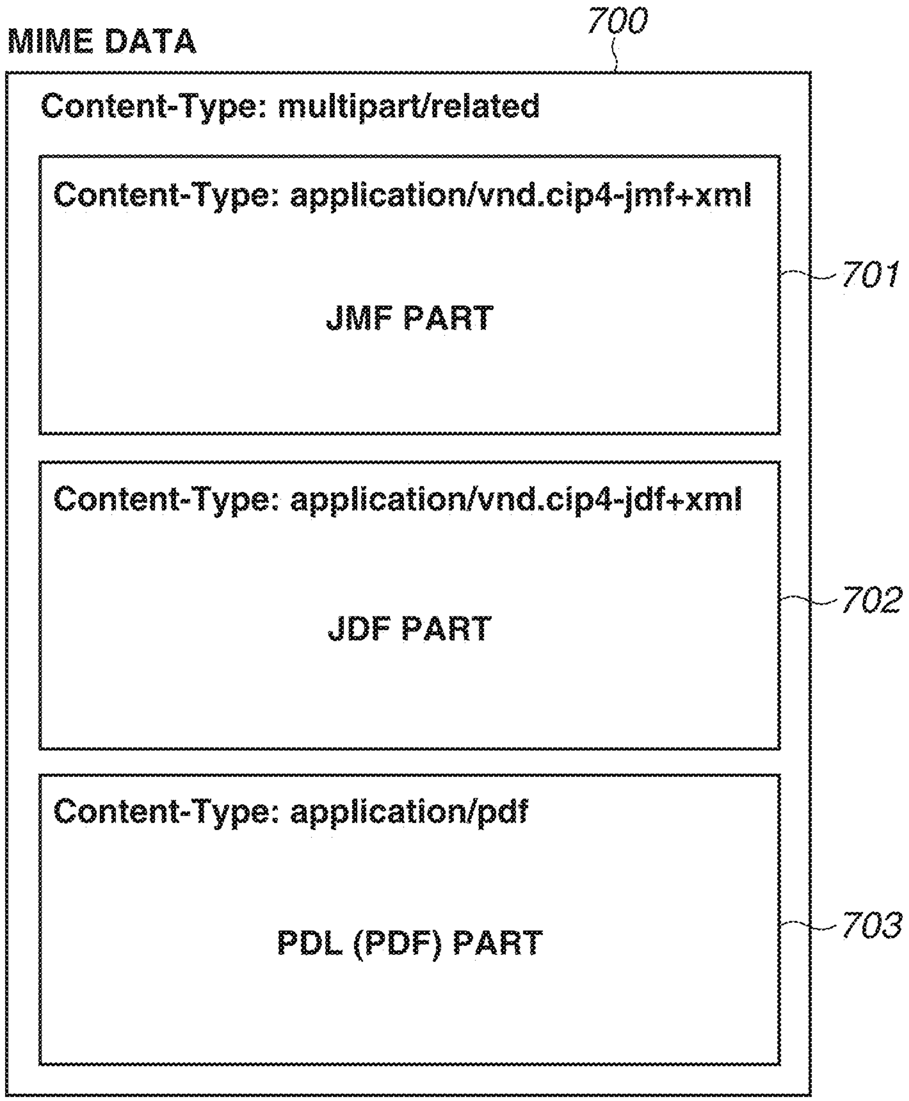

In step S601, the control unit 205 analyzes print job data received from the information processing apparatus 102 via the external I/F unit 210. In the first exemplary embodiment, a print job shall be a JDF job. FIGS. 7A and 7B illustrate a configuration of the print job data and examples of JDF data. In step S602, the control unit 205 determines from the analysis of the print job data (hereinafter, may be referred to as a received job) in step S601 whether the received job includes a sheet specification (instruction information) including an instruction to set sheet-related information (for example, sheet type) for a sheet tray (sheet feed unit). The instruction to set sheet-related information for a sheet tray can be given by various methods. In the present first exemplary embodiment, the instruction is given by adding an AssignMedia attribute to JDF sheet information and giving the AssignMedia attribute a value of true. If there is determined to be a sheet specification including an instruction to set sheet-related information for a sheet tray (YES in step S602), the processing proceeds to step S603. If not (NO in step S602), the processing proceeds to step S616. The processing of steps S603 to S612 is repeated for each sheet specification including an instruction to set sheet-related information for a sheet tray.

In step S603, the control unit 205 performs sheet feature determination processing for determining sheet features from the sheet specification. The sheet feature determination processing is intended to associate features indicating the properties of sheets to be managed by the medium management program 410 with JDF sheet attributes. The correspondence between the JDF sheet attributes and the sheet features to be managed by the medium management program 410 will be described below with reference to the examples of FIGS. 8A to 8C. A set of sheet features determined will be referred to as a sheet type. If the medium management program 410 includes a sheet database and manages registered sheet types with unique identifiers, JDF data can specify a sheet type by specifying its identifier (ID). In such a case, the control unit 205 searches for the sheet type using the specified ID (sheet ID), and obtains the sheet features of the obtained sheet type as the sheet features determined. FIG. 7B illustrates examples of JDF data when a sheet type is specified by using JDF sheet attributes and when a sheet type is specified by using a sheet ID. If the sheet feature determination processing is completed or if an ID or other specification method for uniquely determining a sheet type is used, the processing proceeds to step S604.

In step S604, the control unit 205 performs sheet tray determination processing. The sheet tray determination processing is processing for associating the sheet tray specified by the JDF sheet specification with a sheet feed unit 223. The sheet tray determination processing identifies the sheet feed unit 223 based on a predetermined correspondence between the sheet feed units 223 and JDF attribute values. FIG. 9 illustrates an example of the association. The sheet tray remains undetermined if no sheet tray is specified by the JDF sheet specification, if an attribute value representing automatic determination is specified, or if an unassociated attribute value, i.e., invalid value is specified. After the completion of the sheet tray determination processing, the processing proceeds to step S605.

In step S605, the control unit 205 determines whether the sheet features and the sheet tray are determined in steps S603 and S604. If either or neither is determined (NO in step S605), the processing proceeds to step S615. If both are determined (YES in step S605), the processing proceeds to step S606.

In step S606, the control unit 205 determines whether the specified sheet type is registered in the sheet database. The sheet database contains sheet information registered for repeated use. The sheet database is stored in the HDD 209 and loaded into the RAM 208 as appropriate. If there is no sheet database, the processing of steps S606 to S608 is not needed. If sheet attributes are specified, the control unit 205 determines whether a sheet type matching the sheet features determined in step S603 is registered in the sheet database. If an ID or other information (identification information) uniquely identifying a sheet type is specified, the control unit 205 determines whether a sheet type matching the specified identification information is registered in the sheet database. If the sheet type is registered in the sheet database (YES in step S606) or if there is no sheet database, the processing proceeds to step S609. If the sheet type is not registered in the sheet database (NO in step S606), the processing proceeds to step S607.

In step S607, the control unit 205 determines whether the sheet type can be registered in the sheet database. This determination will be described below with reference to the flowchart of FIG. 10. If the control unit 205 determines that the sheet type can be registered (YES in step S607), the processing proceeds to step S608. If not (NO in step S607), the processing proceeds to step S615.

In step S608, the control unit 205 generates a sheet type including the sheet features determined in step S603, and temporarily registers the sheet type in the sheet database. In this step, the sheet type is not formally registered in the sheet database, but the number of sheet types registered in the sheet database is counted up and stored only in the RAM 208 along with the sheet type. This can prevent needless registration of the sheet type if the job is canceled and not printed due to some factors. The sheet type is formally registered in the sheet database in step S613. If any of the values to be used for registration, such as a sheet name, is not specified in the JDF data at the time of temporary registration, the sheet database automatically determines and registers the values. The sheet features can include various parameters for making adjustments based on the characteristics of the image forming apparatus 101. The values of such parameters may be registered by applying default values. Attributes specifiable by JDF data may be defined.

In step S609, the control unit 205 determines whether the sheet type is set for the sheet tray determined in step S604. The control unit 205 obtains sheet type information set for the sheet trays of the sheet feed units 223 stored in the RAM 208, and determines whether the sheet trays match the sheet type. The determination may be made by comparing the sheet type with the unique sheet type in the sheet database or by comparing the sheet features of the sheet type with those in the sheet database for a perfect match. In the former case, there can only be one sheet type determined to be set. In the latter case, there can be a plurality of combinations of sheet features, i.e., sheet types that match. If the sheet type is set (YES in step S609), the processing proceeds to step S612. If not (NO in step S609), the processing proceeds to step S610.

In step S610, the control unit 205 determines whether the sheet type can be set for the sheet tray. The determination criteria may include capability information about the sheet tray, a mismatch with an automatic detection result from the sheet tray, and the presence or absence of a different sheet type set for the same sheet tray. The capability information about the sheet tray is derived from restrictions on the feeding capability of the sheet feed unit 223. For example, if the sheet tray is small, a sheet type having a large sheet size such as A3 is not settable. There can also be sheet types not capable of feeding because of the sheet thickness, shape, and/or the presence or absence of coating. The control unit 205 compares the capability information about the sheet tray with the features of the sheet type, and determines whether the sheet type can be set. As for a mismatch with the automatic detection result from the sheet tray, the control unit 205 determines that the sheet type is not settable if the sheet feed unit 223 has an automatic sheet size detection function and the size of the sheet type is different from the sheet size detected. As for the presence or absence of a different sheet type set for the same sheet tray, the control unit 205 determines that the sheet type is not settable if the specified sheet tray has already been associated with another sheet type by another Media part 715 in step S611. If the sheet type is determined to be settable (YES in step S610), the processing proceeds to step S611. If not (NO in step S610), the processing proceeds to step S615.

In step S611, the control unit 205 stores the correspondence between the sheet tray and the sheet type into the RAM 208. Here, the sheet type is not set for the sheet tray yet, but will be set in step S614 in a collective manner. This prevents needless change of sheet types for sheet trays if the job is canceled and not printed due to some factors.

In step S612, the control unit 205 determines whether there is an unprocessed sheet specification among those including instructions to set sheet-related information for sheet trays. If there is an unprocessed sheet specification (YES in step S612), the processing proceeds to step S603. In step S603, the control unit 205 processes the target sheet specification. If not (NO in step S612), the processing proceeds to step S613.

In step S613, the control unit 205 registers the sheet type(s) temporarily registered and stored in RAM 208 in step S608, if any, into the sheet database and stores the sheet type(s) into the RAM 208 and the HDD 209.

In step S614, the control unit 205 sets the sheet type(s) stored in step S611 for the corresponding sheet tray(s), if any, and stores the sheet type(s) into the HDD 209 and the RAM 208. After the setting, the processing proceeds to step S616.

In step S615, the control unit 205 cancels the accepted print job. In such a case, the print job is not printed. The control unit 205 desirably returns, as a result of the print job, information for the user to identify the cause of the transition to step S615. FIGS. 11A to 11C illustrate information using Job Messaging Format (JMF) as examples of the information to be returned.

In step S616, the control unit 205 prints the accepted print job. Since this print processing is similar to normal print processing, details will be omitted. Since the sheet types instructed to be set are either set for the sheet trays in step S614 or determined to be already set for the sheet trays in step S609, the operator does not need to manually perform processing for setting the sheet types. In other words, the operator can register the sheet types for the sheet trays and specify the sheet types to be used in printing by simply loading sheets into the sheet trays and submitting the print job. The control unit 205 desirably returns, as a result of the print job, the states of the sheet trays after the sheet setting in step S614 and information about the sheet types registered in step S613. FIGS. 11A to 11C illustrate information using JMF as examples of the information to be returned.

FIGS. 12A to 12H are schematic diagrams illustrating how sheet types set for sheet trays are changed.

<Configuration of Print Job Data>

FIGS. 7A to 7C are schematic diagrams illustrating print job data received from the information processing apparatus 102 and JDF data included in the print job data.

FIG. 7A illustrates a data configuration when the print job data is a print instruction request using JDF.

Multipurpose Internet Mail Extensions (MIME) data 700 is obtained by connecting JMF, JDF, and PDL files constituting the print job data in a MIME format. MIME is a scheme devised for an email to handle various files. The files constituting MIME data are connected as parts sectioned by character strings called boundaries. Each part includes a part header at the beginning. The part header describes information about the file included in the part.

A JMF part 701 is a MIME part containing a JMF file. The present exemplary embodiment deals with a case where the JMF part 701 includes Command-SubmitQueueEntry for issuing a print instruction. The JMF part 701 is the only part that is always included in the MIME data 700 in practicing the present exemplary embodiment. The JMF part 701 is always included as the first part of the MIME data 700. If the print job data includes no other parts than the JMF part 701, the JMF part 701 may be directly described in the request body without being converted into the MIME format.

A JDF part 702 is a MIME part containing a JDF file. Any specifications related to print specifications can be written in the JDF part 702. A PDL part 713 is a print specification to always be included in practicing the present exemplary embodiment. The JDF part 702 will be described below with reference to the example of FIG. 7B. The JMF part 701 is not always transmitted simultaneously with the JDF part 702, and may specify the URL of the location of the JDF file. In such a mode of specification, the JDF part 702 is not included in the MIME data 700.

A PDL part 703 is a MIME part containing a PDL file. FIG. 7A illustrates a case where the PDL file is a PDF file. Unlike the JMF part 701 or the JDF part 702, a plurality of PDL parts 703 can be included in the MIME data 700. The MIME data 700 can be without a PDL part 703.

FIG. 7B illustrates an example of JDF data 710 used in the present exemplary embodiment.

A JDF part 711 is a part describing a JDF element. JDF data always starts with a JDF element. If the root element is not a JDF element, the control unit 205 detects an Extensible Markup Language (XML) syntax error in step S601. A Resource part 712 is a part describing resources to be used. Values for specifying settings to be used in printing, a print file, and print sheets are described in the Resource part 712.

A DigitalPrintingParams part 713 is a part describing the settings to be mainly used in printing among the resources. A MediaRef part 714 is a part for specifying the sheets to be used in printing. In the illustrated example, a sheet specification is made in a Media part 715, and the MediaRef part 714 specifies the sheets to be used in printing by referring to the sheet specification in the Media part 715. A plurality of MediaRef parts 714 can be included to specify switching of sheets between pages, whereas in the illustrated example, one sheet type is specified for the entire print job for the sake of simplicity of description.

The Media part 715 is a part for making a sheet specification. A plurality of Media parts 715 can be specified. The sheet specification in the Media part 715 is activated when referred to from a location corresponding to the use purpose, similarly to the MediaRef part 714.

A sheet type attribute specification 716 is a set of attributes and attribute values for specifying a sheet type by using sheet attributes. The JDF attributes and attribute values are associated with the sheet features managed by the medium management program 410 in step S603.

A sheet setting specification 717 includes an attribute and an attribute value for giving an instruction to set the sheet type specified in the Media part 715 for a sheet tray. In the example of the present exemplary embodiment, the instruction to set the specified sheet type for a sheet tray is considered to be given if "true" is specified in an "AssignMedia" attribute. If the instruction to set the specified sheet type for a sheet tray is given, the processing of steps S603 to S612 is performed.

A sheet tray specification part 718 is a part for specifying the sheet tray to feed the sheets. The attribute value specified here is used in the sheet tray determination processing of step S604.

A second Media part 720 illustrates an example where a sheet type is specified by uniquely determined information. The specification can be changed by replacing the Media part 715 with the second Media part 720.

A sheet ID specification part 721 is a part for specifying the sheet type by a uniquely identifiable sheet ID. The sheet ID is assigned and managed by the sheet database. Sheet types that are sets of sheet features are registered in the sheet database. If sheets are specified by a sheet ID, sheet features can be determined by referring to the corresponding sheet type. If a value not included in the sheet database is specified as the sheet ID, sheet features are unable to be determined, and the control unit 205 determines in step S605 that sheet features are yet to be determined.

<Correspondence Between Sheet Attribute Specification Values and Sheet Features Managed by Medium Management Program>

FIGS. 8A to 8C illustrate examples of correspondence tables used in associating sheet features expressing sheet properties to be managed by the medium management program 410 with JDF sheet attributes. The correspondence tables illustrated in FIGS. 8A to 8C are used in the sheet feature determination processing of step S603.

FIG. 8A illustrates a JDF sheet attribute feature correspondence table 800 listing the correspondence between the sheet features managed by the medium management program 410 and attributes related to the JDF sheet. Each row includes three columns, namely, a feature name column 801, a JDF attribute column 802, and an association column 803. Each row defines a sheet feature managed by the medium management program 410, a corresponding JDF attribute (JDF sheet attribute), and how to associate the two.

The feature name column 801 is a column describing the features of a sheet type to be managed by the medium management program 410. A sheet type is defined as a set of a plurality of sheet features. In the present exemplary embodiment, six sheet features, namely, a name, grammage, size, surface property, shape, and color are used. However, the sheet features are not limited to these six, and other sheet features may be used.

The JDF attribute column 802 is a column listing JDF attributes. The association column 803 is a column listing how to associate the feature names in the feature name column 801 with the JDF attributes in the JDF attribute column 802.

An example will be described. The feature name "name" in the first row corresponds to a JDF attribute "DescriptiveName", and the association column 803 indicates that the attribute value specified for the JDF attribute "DescriptiveName" is simply used as the value of the sheet feature "Name". If the character code used in the JDF data 710, Unicode Transformation Format-8 (UTF-8), is different from the one used by the medium management program 410, the character code is converted. If XML special characters are included, the special characters are converted into original characters.

The sheet feature "Surface property" and the sheet feature "Shape" will be described with reference to FIGS. 8B and 8C. A description of the sheet feature "Color" will be omitted, whereas the sheet feature "Color" also has a JDF sheet attribute value color correspondence table listing the correspondence between the values of the sheet feature "Color" and JDF attributes and attribute values, like the tables of FIGS. 8B and 8C.

FIG. 8B illustrates a JDF sheet attribute value surface property correspondence table 810 listing the correspondence between the values of the sheet feature "Surface property" and JDF attributes and attribute values. Each row includes a surface property feature value column 811 describing the value of a surface property (surface property feature value), and a JDF surface property attribute value column 812, which is a compound column describing the JDF attributes and attribute values. JDF surface property attributes 813 describe the JDF attributes. JDF surface property attribute values 814 below the JDF surface property attributes 813 list the attribute values corresponding to the feature attributes.

An example will be described. The surface property feature value "Film" in the first row is associated with a case where an attribute value "Translucent" is specified in a JDF attribute "Opacity". Similarly, the surface property feature value "Embossed" in the second row is associated with a case where "Embossed" is specified in a JDF attribute "Texture". The surface property feature values shall be associated in descending order in the table. For example, if the attribute value "Translucent" is specified in the JDF attribute "Opacity" and the attribute value "Embossed" is specified in the JDF attribute "Texture", the surface property feature value "Film" is associated first. The surface property feature value is thus determined to be "Film". A surface property feature value is thus uniquely determined based on the JDF sheet attribute value surface property correspondence table 810 regardless of what sheet attributes are specified. The surface property feature values, the JDF attributes, and the attribute values do not need to be limited to the ones described here.

FIG. 8C illustrates a JDF sheet attribute value shape correspondence table 820 listing the correspondence between the values of the sheet feature "Shape" and JDF attributes and attribute values. Since the association method is similar to that of the JDF sheet attribute value surface property correspondence table 810, a description thereof will be omitted. The table of FIG. 8B relates to the sheet feature "Surface property". The table of FIG. 8C relates to the sheet feature "Shape". Since the table of FIG. 8C can be read in a similar manner with that of FIG. 8B, a description thereof will be omitted.

<Correspondence Between Sheet Tray Specification Values and Sheet Feed Units>

FIG. 9 illustrates an example of a sheet tray attribute value correspondence table 900 used in associating the sheet feed units 223 with JDF sheet tray attribute values in the sheet tray determination processing of step S604.

Each row of the sheet tray attribute value correspondence table 900 includes a sheet feed unit column 901 and a JDF attribute "LocationName" attribute value column 902. The sheet tray attribute value correspondence table 900 defines the correspondence between the sheet trays, e.g., sheet feed units 223, and JDF attribute values.

The sheet feed unit in the first row, a main body left cassette 223*a*, corresponds to an attribute value "Tray-1" of a JDF attribute "LocationName". In other words, in step S604, the Media part 715 where "Tray-1" is specified in the attribute "LocationName" of the sheet tray specification part 718 is determined to include a sheet specification that the sheet tray is the main body left cassette 223*a*.

If a value not described in the JDF attribute "LocationName" attribute value column 902 is specified, the control unit 205 determines the sheet tray determination processing of step S604 that the sheet tray is yet to be determined. The processing then proceeds to step S615 based on the determination in step S605. If a sheet feed deck upper stage 223*c*, middle stage 223*d*, or lower stage 223*e* is specified without the detachable large-capacity sheet feeding apparatus 220 connected, the control unit 205 similarly determines that the sheet tray is yet to be determined.

In this example, each sheet feed unit corresponds to a "LocationName" attribute value. However, a plurality of "LocationName" attribute values may be assigned to one sheet feed unit. If there is a plurality of large-capacity sheet feeding apparatuses 220 that is unable to be simultaneously attached, the same "LocationName" attribute value may be assigned to a plurality of sheet feed units 223.

<Flowchart for Sheet Type Registrability Determination>

Figure 10:
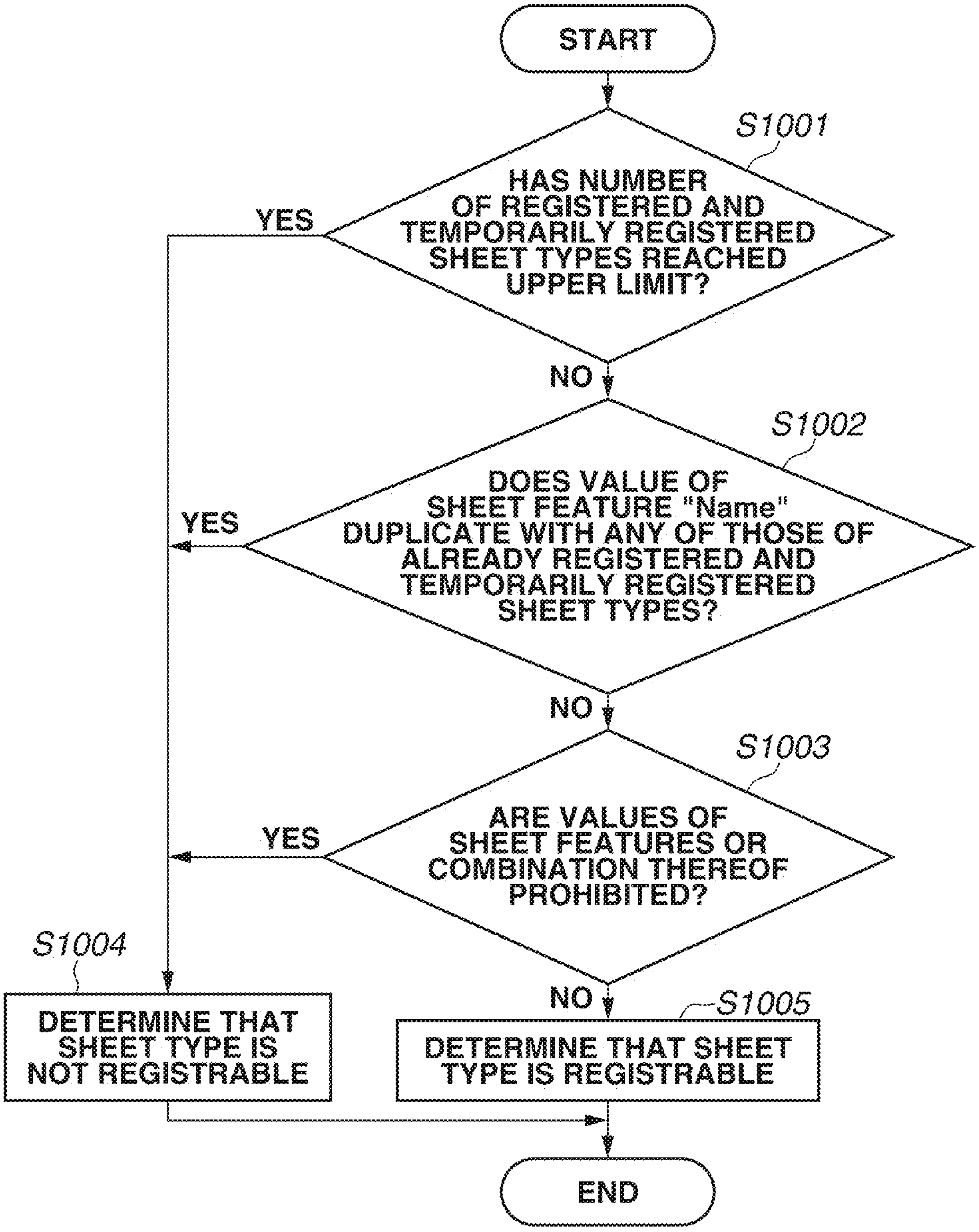
FIG. 10 is a flowchart for describing a processing procedure of sheet type registrability determination.

FIG. 10 is a flowchart illustrating a processing procedure of the control unit 205 in determining, in step S607, whether a sheet type can be registered in the sheet database.

In step S1001, the control unit 205 determines whether the number of sheet types registered and temporarily registered in the sheet database has reached its upper limit. The upper limit of the number of sheet types registrable is determined in advance. The determination uses the number of sheet types including the number of sheet types temporarily registered in step S608. If the number of registered and temporarily registered sheet types has reached the upper limit (YES in step S1001), the processing proceeds to step S1004. If not (NO in step S1001), the processing proceeds to step S1002.

In step S1002, the control unit 205 determines whether the value of the sheet feature "Name" of the specified sheet type duplicates with any of those of the already registered and temporarily registered sheet types. The method for determining the value of the sheet feature "Name" has been described with reference to FIG. 8A. If no value is specified in the sheet feature "Name", a unique name may be automatically given and the value of the sheet feature "Name" may be determined to not have a match in step S1002. If there is no duplicate of the value of the sheet feature "Name" (NO in step S1002), the processing proceeds to step S1003. If there is a duplicate of the value of the sheet feature "Name" (YES in step S1002), the processing proceeds to step S1004.

In step S1003, the control unit 205 determines whether the values of the sheet features determined in step S603 or the combination thereof is/are prohibited and not registrable in the sheet database. Prohibited values and combinations are determined in advance. Examples of the prohibited values include a size value not settable for any of the sheet feed units 223, and a grammage value exceeding sheet thicknesses that the image forming apparatus 101 can handle. Examples of the prohibited combinations include a nonstandard combination that the image forming apparatus 101 is unable to handle, like a size of A5 with a shape of an index sheet, and a combination where there is no such sheet, like a grammage of 60 $g/m^2$ with a surface property "Embossed". If the values of the sheet features or the combination thereof is/are determined to be prohibited (YES in step S1003), the processing proceeds to step S1004. If not (NO in step S1003), the processing proceeds to step S1005.

In step S1004, the control unit 205 determines that this sheet type is not registrable. After the determination, the flowchart ends.

In step S1005, the control unit 205 determines that this sheet type is registrable. After the determination, the flowchart ends.

The determination of step S607 is made based on the determination made in step S1004 or S1005.

<Schematic Diagrams of JMF Data for Notifying of Result of Received Job>

FIGS. 11A to 11C illustrate examples of data to be transmitted in step S615 or S616, notifying of the result of the received job.

FIG. 11A illustrates an example of the data transmitted as the result of the received job when the job is canceled in step S615. In this example, a JMF command Command-ReturnQueueEntry for notifying of the result of a JDF job is used.

Job cancellation time transmission data 1100 is an example of the transmission data when Command-ReturnQueueEntry is transmitted in a MIME format. The transmission data is partially omitted as appropriate. The job cancellation time transmission data 1100 is broadly divided into a Command-ReturnQueueEntry part 1101 and a notification JDF part 1103. The parts at the beginning of the job cancellation time transmission data 1100, between the parts 1101 and 1103, and at the end of the job cancellation time transmission data 1100 are a header and data part boundary strings used in the MIME and HTTP formats.

The Command-ReturnQueueEntry part 1101 is a part describing the command for notifying of the result of the received JDF job. A description of the command itself will be omitted.

A ReturnQueueEntryParams part 1102 is a part describing an element containing the job result. A "ReturnQueueEntryParamsAborted" attribute and its value "PrintJob1" indicate that a JDF job with an ID of "PrintJob1" is aborted. A "URL" attribute indicates the location of the submitted JDF data. For the URL, the HTTP protocol indicating that the JDF data is located on an HTTP server can be used aside from the Content Interactive Delivery (CID) protocol indicating that the JDF data is stored in the MIME data.

The notification JDF part 1103 is a part storing the JDF data corresponding to the job notified by the Command-ReturnQueueEntry part 1101. Since the CID protocol is specified in the "URL" attribute of the ReturnQueueEntryParams part 1102, the JDF data is included in the job cancellation time transmission data 1100. If the HTTP protocol is specified, the notification JDF part 1103 is located on an external server. The notification JDF part 1103 is JDF data corresponding to the JDF data 710. Portions similar to the JDF data 710 are omitted in the diagram.

An AuditPool part 1104 is a part describing the execution result of the JDF data 710 and contents edited during the execution.

A Notification part 1105 is a part describing the notification contents. Since the job is canceled in this example, a "Type" attribute indicating the type of notification has a value of "Error", and a "Class" attribute indicating classification has a value of "Fatal" representing job cancellation.

A Comment part 1106 is a part describing a message to be notified. In this example, a message for the case where the number of sheet types registered and temporarily registered in the sheet database has reached the upper limit in step S1001 is illustrated. To identify the Media part 715 causing the cancellation, the message includes the value of the ID attribute of the Media part 715. FIG. 11B illustrates examples of messages when a job is canceled from other causes.

An ErrorElement part 1107 is a part for storing an ID for identifying the cause of the error. As illustrated in an error corresponding table 1120 of FIG. 11B, an "ErrorID" attribute is assigned respective different values depending on the causes of the error. The cause of the job cancellation can thus be found out from the value of the "ErrorID" attribute alone, which is advantageous in terms of program processing.

FIG. 11B illustrates the error corresponding table 1120 describing the correspondence between the values in the Comment part 1106 and the ErrorElement part 1107, and the content of errors causing job cancellation.

A content of error column 1121 is a column listing the causes for job cancellation. The causes have been described with reference to the flowcharts of FIGS. 6 and 10.

An ErrorID column 1122 is a column listing the IDs assigned to the respective causes. The IDs are used in the ErrorElement part 1107.

An error message column 1123 is a column listing messages to be notified of when the errors occur. The messages are used in the Comment part 1106.

FIG. 11C illustrates an example of data transmitted as a result of the received job after the print processing in step S616. Similarly to FIG. 11A, a JMF command Command-ReturnQueueEntry is used. If the operator cancels the received job during the print processing or the received job is canceled from some reasons, the cancel notification illustrated in FIG. 11A is transmitted. An example where the print processing is normally completed will now be described.

FIG. 11A illustrates an example of the data transmitted as a result of the received job when the received job is canceled in step S615. In this example, the JMF command Command-ReturnQueueEntry for notifying of the result of a JDF job is used.

In FIG. 11C, a second ReturnQueueEntryParams part 1121 is a part describing an element containing the result of the received job. The second ReturnQueueEntryParams part 1121 is for the case where the received job is normally completed. A "ReturnQueueEntryParamsCompleted" attribute and its value "PrintJob1" indicate that the JDF job with an ID of "PrintJob1" is normally completed.

A second Notification unit 1122 is a part describing the content of notification. The second Notification unit 1122 is for the case where the received job is normally completed. The "Type" attribute indicating the type of notification has a value of "Events", and the "Class" attribute indicating classification has a value of "Information" representing information.

A second Comment part 1123 is a part describing messages to be notified of. This example illustrates messages for the case where a sheet type corresponding to the Media part 715 in which an "ID" attribute has a value of "MED_000" is registered in the sheet database in step S613 and the sheet type is set for the main body left cassette 223*a* in step S614. The contents of the second Comment part 1123 vary depending on the presence or absence and the number of sheet types registered in the sheet database and the presence and absence and the number of sheet types set for the sheet feed units 223.

<Schematic Diagrams for Describing Processing Procedure>

FIGS. 12A to 12H are schematic diagrams for describing the processing procedure according to the present exemplary embodiment, and illustrate changes of data and settings in the processing steps.

FIG. 12A illustrates a sheet database 1200 before process execution. For the sake of simplification, suppose that the attributes are a name, size, surface property, shape, and grammage, and unique IDs are assigned for respective sheet types. The number of registered sheet types is four. Before execution of processing (or before process execution) refers to before a start of the flowchart of FIG. 6.

FIG. 12B illustrates sheet tray settings and in-tray sheets 1201 before process execution. A set sheet column lists the sheet types set for the respective sheet feed units listed in a sheet feed unit column. An actual sheet column lists the sheet types of sheets actually loaded in the sheet trays. As described above, the operator loads the sheet trays with sheets to be used for the job to be submitted in advance according to written instructions. Since the sheet settings are not changed via a UI, the sheet types of the actual sheets disagree with the sheet settings at this point in time. While the diagram illustrates IDs used in Media parts 715 of the JDF data, the written instructions describe specific sheet names and IDs.

FIG. 12C illustrates specifications 1202 in the Media parts 715 of the JDF data on the submitted job. The Media parts 715 have been described with reference to FIG. 7B. An ID column lists values specified as IDs for uniquely identifying the Media parts 715. An AssignMedia column is a column that lists values specified in the sheet setting specifications 717 or indicates the absence of specification in the sheet setting specifications 717. A sheet attribute/ID column is a column listing values specified in the sheet type attribute specifications 716 or the sheet ID specification parts 721. A LocationName column is a column listing values specified in the sheet tray specification parts 718. FIG. 12C illustrates a case where four sheet types are specified for the submitted job.

FIG. 12D illustrates results 1203 of the sheet feature determination processing in step S603 and the sheet tray determination processing in step S604. The Media parts 715 are practically processed one by one, whereas FIG. 12D collectively illustrates the processing results of all the Media parts 715. Since the JDF job includes three Media parts 715 where "true" is specified in the "AssignMedia" attribute, which is the sheet setting specification 717, the processing proceeds from step S602 to step S603. Since the processing of steps S603 to S612 is performed only on sheet types instructed to be set for sheet trays, only the Media parts 715 with IDs of MEDIA_001, MEDIA_003, and MEDIA_004 are subjected to the processing. A sheet feature column lists the results of the sheet feature determination processing in step S603. The method for determining sheet features from the sheet type attribute specification 716 has been described with reference to FIGS. 8A to 8C. A sheet tray column list the results of the sheet tray determination processing in step S604. The method for determining a sheet tray from the attribute value in the sheet tray specification part 718 has been described with reference to FIG. 9.

FIG. 12E is a diagram illustrating the result of the temporary sheet type registration in step S608. FIG. 12E illustrates both the sheet database 1200 and a temporarily registered sheet type 1204. As described above, sheet types are not registered in the sheet database in step S608 but temporarily registered and stored into the RAM 208. The state of the sheet database 1200 is therefore unchanged from that of the sheet database 1200 before process execution. FIG. 12E also illustrates the results of the determinations made in step S606 whether the sheet types are registered in the sheet database. The Media part 715 with an ID of MEDIA_003 where a sheet ID is specified by the sheet ID specification part 721 corresponds to the sheet type having the corresponding ID and a name of "FESFE3". The Media part 715 with a sheet ID of MEDIA_001 where the sheet feature "size" is determined to be A4, the sheet feature "surface property" high quality paper, and the sheet feature "shape" an index sheet corresponds to the sheet type having a name of "KHAD2". The Media part 715 with a sheet ID of MEDIA_004 corresponds to the temporarily registered sheet having a name of "Film1".

FIG. 12F illustrates a result 1205 of associations made between the sheet trays and the sheet types in step S611.

The sheet feed units 223 are associated with sheet types based on the results 1203 of the sheet feature determination processing in step S603 and the sheet tray determination processing in step S604. As described above, the set sheet types are not changed at this point in time. The set sheet types are therefore the same as in the sheet tray settings and in-tray sheets 1201 before process execution.

FIG. 12G illustrates a sheet database 1206 after the registration of temporarily registered sheet types in step S613.

The name "Film1" of the temporarily registered sheet type 1204 is registered in the sheet database 1206, and there are five sheet types registered. The temporarily registered sheet type 1204 stored in the RAM 208 may be discarded.

FIG. 12H illustrates sheet tray settings and in-tray sheets 1207 after the setting of sheet types for sheet trays in step S614. The result 1205 of the associations made between the sheet trays and sheet types in step S611 is reflected on the set sheet column. The sheet type generated and registered based on the sheet attributes specified in the Media part 715 with an ID of MEDIA_004 is set for the main body left cassette 223*a*. The sheet type determined from the sheet ID specified in the Media part 715 with an ID of MEDIA_003 is set for the main body right cassette 223*b*. The sheet type determined from the sheet attributes specified in the Medial part 715 with an ID of MEDIA_001 is set for the sheet feed deck upper stage 223*c*. The sheet types of the sheets located into the sheet trays before the submission of the job based on the written instructions therefore agree with the set sheet types.

According to the present exemplary embodiment, sheet types can be automatically set for sheet trays and printing can be performed by simply loading sheets into the sheet trays based on the written instructions and submitting the job. The image forming apparatus 101 includes the sheet database, and if a sheet type specified in the job is not registered in the sheet database, automatically registers the specified sheet type. Sheet setting operations on the image forming apparatus 101 with a long lead time in making preparation before printing can thus be omitted.

The first exemplary embodiment is predicated on a situation where sheets are loaded into the sheet trays before the submission of the job. However, sheets can be not loaded in the sheet trays before the submission of the job. Examples of such a situation include where there is another preceding print job in a print queue, and where printing is not performed immediately. A second exemplary embodiment addresses the cases where sheets are loaded after the submission of the job.

In the present exemplary embodiment, an operation in the case of accepting a job as a combination of a plurality of instructions will be described. The method for specifying sheet types is separable from the other processing operations, and can thus be mutually replaced with that of the first exemplary embodiment. As an example, a configuration of job data using JMF and JDF will be described.

<Schematic Diagrams of JMF Data and JDF Data>

FIGS. 13A to 13C illustrate job data accepted in the present exemplary embodiment. FIGS. 13A and 13B illustrate JMF data 1300 and 1310. FIG. 13C illustrates JDF data 1320. Similarly to the first exemplary embodiment, the job data has the configuration illustrated in FIG. 7A. Even in the present exemplary embodiment, the JDF part 702 and the PDL part 703 may be located on an external server instead of being include in the job data.

FIG. 13A illustrates the JMF data 1300 constituting the JMF part 701 in the received job. A JMF part 1301 is a part describing a JMF element. JMF data always starts with a JMF element. If the root element is not a JMF element, an XML syntax error is detected in step S1401. A JMF element including no message (command part) also causes an XML syntax error. The JMF part 1301 includes one or a plurality of messages. In the present exemplary embodiment, a job including a combination of a plurality of instructions is generated by describing two or three commands in the JMF part 1301.

A sheet registration command part 1302 is a part describing a command for giving an instruction to register a specified sheet type in a sheet database. The sheet registration command part 1302 is not included if the image forming apparatus 101 has no sheet database, if the sheet type is already registered in the sheet database, or if the sheet type does not need to be registered in the sheet database. FIG. 13B illustrates an example where the sheet registration command part 1302 is not included.

A registration Media part 1303 is a part for specifying the sheet type to be registered by the sheet registration command part 1302.

A sheet feature specification attribute part 1304 is a set of attributes and attribute values for specifying the features of the sheet type to be registered by this command. The registration Media part 1303 specified in the sheet registration command part 1302 specifies the features of the sheet type using sheet attributes. Unlike the second Media part 720, an ID in the sheet database is not usable for specification. The correspondence between JDF attributes and attribute values and the sheet features to be managed by a medium management program 410 are similar to that described in the first exemplary embodiment.

A sheet setting command part 1305 is a part describing a command for giving an instruction to set the specified sheet type for a sheet tray.

A setting sheet tray specification part 1306 is a part for specifying the sheet tray for the sheet type to be set for by the sheet setting command part 1305. Values that can be specified in a "Location" attribute are the same as those in the "LocationName" attribute of the sheet tray specification part 718 according to the first exemplary embodiment. The correspondence between sheet feed units 223 and the JDF attribute values is also the same as in the first exemplary embodiment.

A setting sheet MediaRef part 1307 is a part for specifying the sheet type to be set for the sheet tray specified in the setting sheet tray specification part 1306. In this example, the setting sheet MediaRef part 1307 specifies the sheet type by referring to the sheet type specified in the registration Media part 1303. A Media part may be specified instead of making reference. The same sheet type as that to be registered by the sheet registration command part 1302 does not need to be set, either.

A print command part 1308 is a part describing a command for giving a print instruction.

A JDF specification part 1309 is a part for specifying JDF data to be used for the print instruction. The location of the JDF data is specified in a "QueueSubmissionParamsURL" attribute. This example illustrates the specification method where the JDF data is included in the MIME data.

FIG. 13B illustrates second JMF data 1310 in a case where the sheet registration command part 1302 is not included. The second JMF data 1310 can be used in place of the JMF part 701.

A second sheet setting command part 1312 illustrates an example of a method for specifying a sheet setting command in the case where the sheet registration command part 1302 is not included.

A second registration Media part 1314 is a part for specifying the sheet type to be set by the sheet setting command. In this example, the sheet type is specified by using an ID in the sheet database. However, the sheet type can also be specified by using sheet attributes as in the registration Media part 1303.

A plurality of sheet registration command parts 1302 and a plurality of sheet setting command parts 1305 may be specified. Even in such a case, the sheet registration command parts 1302, the sheet setting command parts 1305, and the print command part 1308 are specified in this order.

FIG. 13C illustrates a second JDF part 1320 as an example of the JDF part 702. In the example of the second JDF part 1320, unlike the JDF part 707, the Media part 715 is not specified, and the MediaRef part 714 refers to a medium specified in the JMF part 701. This can more explicitly specify that the sheets to be used are the same as those specified in the JMF part 701. As described in the JDF data 710, a sheet ID or sheet attributes can be specified to specify the same sheet type as the media specified in the JMF part 701. Alternatively, a different sheet type from the media specified in the JMF part 701 can be specified. In such a case, sheet setting on the sheets is not performed.

Flowchart in Accepting Job According to Second Exemplary Embodiment

Figure 14:
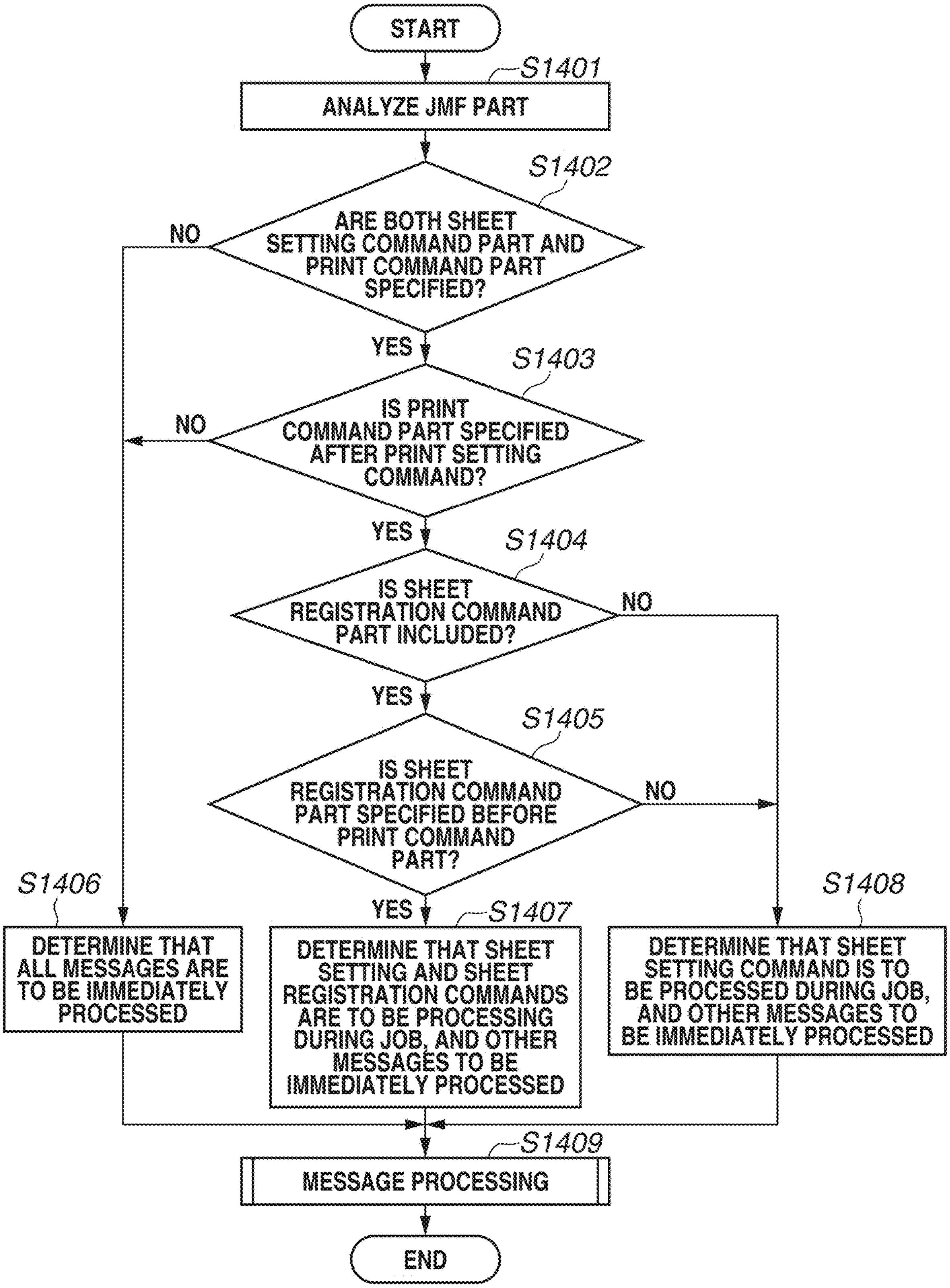
FIG. 14 is a flowchart for describing a processing procedure in accepting a job according to the second exemplary embodiment.

FIG. 14 is a flowchart illustrating a processing procedure in accepting a received job according to the present exemplary embodiment. The flowchart starts upon reception of the job.

In step S1401, a control unit 205 analyzes the JMF part 701. The analysis is similar to an ordinary XML analysis. In step S1402, the control unit 205 determines whether both the sheet setting command part 1305 or 1312 and the print command part 1308 are specified in the JMF data analyzed in step S1401. If either one is specified or if neither is specified (NO in step S1402), the processing proceeds to step S1406. If both are specified (YES in step S1402), the processing proceeds to step S1403.

In step S1403, the control unit 205 determines whether the print command part 1308 is specified after the sheet setting command part 1305 or 1312. Whether a command part is specified after another refers to whether the command part is described after another in terms of XML code. If a plurality of messages is specified in JMF data, the messages are usually processed in the order of the XML code. In other words, the control unit 205 determines here whether there is a specification for executing a sheet setting command before the print command part 1308. If the print command part 1308 is specified after the sheet setting command part 1305 or 1312 (YES in step S1403), the processing proceeds to step S1404. If not (NO in step S1403), the processing proceeds to step S1406.

In step S1404, the control unit 205 determines whether the sheet registration command part 1302 is included in the JMF data analyzed in step S1401. If the sheet registration command part 1302 is included (YES in step S1404), the processing proceeds to step S1405. If not (NO in step S1404), the processing proceeds to step S1408.

In step S1405, the control unit 205 determines whether the sheet registration command part 1302 is specified before the print command part 1308 in terms of the XML code. If the sheet registration command part 1302 is specified before the print command part 1308 (YES in step S1405), the processing proceeds to step S1407. If not (NO in step S1405), the processing proceeds to step S1408.

In step S1406, the control unit 205 determines that all the messages included in the JMF data are to be immediately processed. The control unit 205 records the determination result into the RAM 208. After the determination, the processing proceeds to step S1409.

In step S1407, the control unit 205 determines that the sheet setting command and the sheet registration command are to be processed during the job, and the other messages to be immediately processed. The control unit 205 records the determination result into the RAM 208. After the determination, the processing proceeds to step S1409.

In step S1408, the control unit 205 determines that the sheet setting command is to be processed during the job, and the other messages to be immediately processed. The control unit 205 records the determination result into the RAM 208. After the determination, the processing proceeds to step S1409.

In step S1409, the control unit 205 performs message processing. The message processing will be described with reference to the flowchart of FIG. 15.

<Flowchart During Message Processing>

Figure 15:
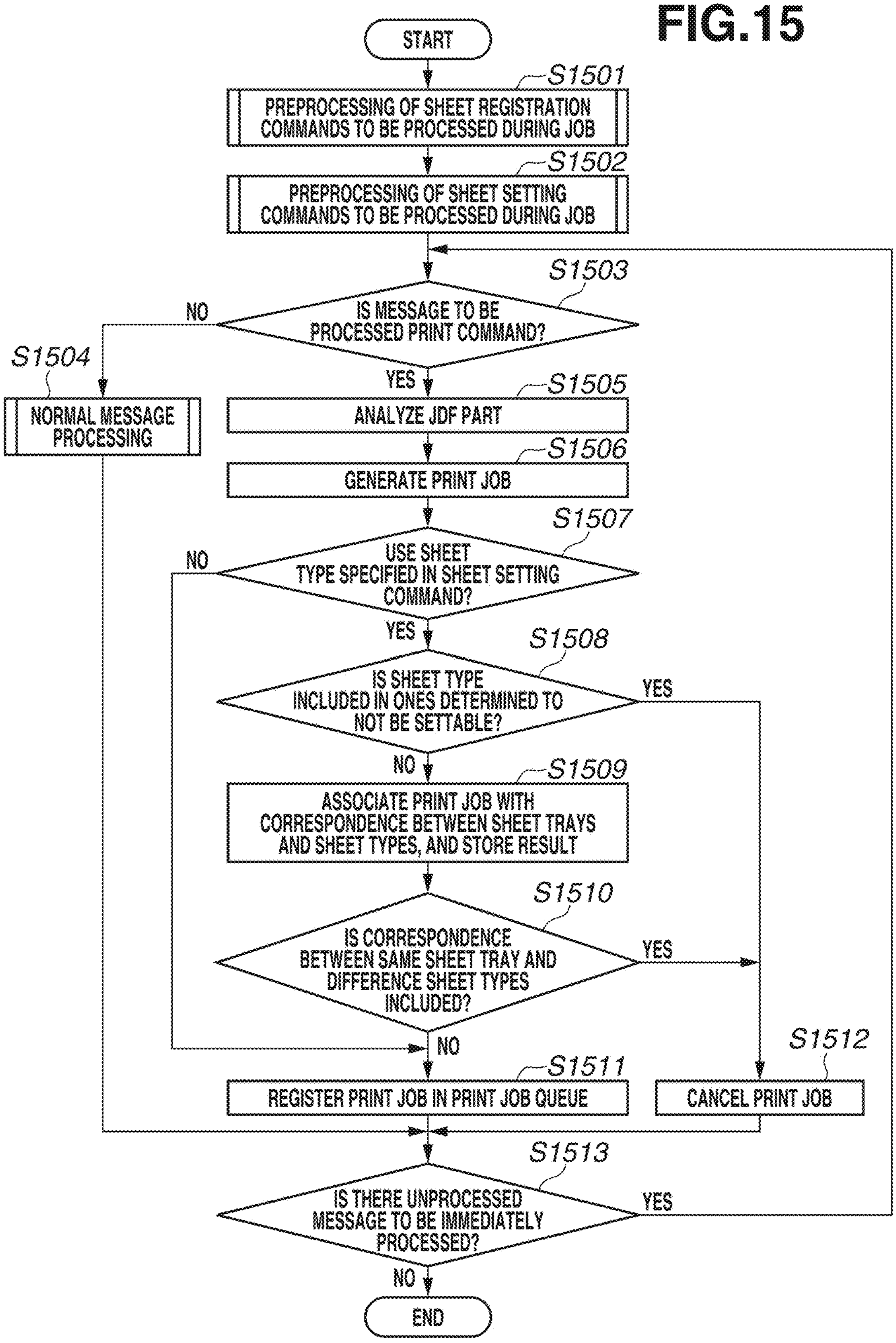
FIG. 15 is a flowchart for describing a processing procedure of message processing.

FIG. 15 is a flowchart illustrating a procedure of the message processing performed in step S1409.

In step S1501, the control unit 205 performs preprocessing of sheet registration commands to be processed during the job. This preprocessing will be described below with reference to FIG. 16. In step S1502, the control unit 205 performs preprocessing of sheet setting commands to be processed during the job. This preprocessing will be described below with reference to FIG. 17.

Steps from S1503 to S1512 are performed on each message determined to be immediately processed in step S1406, S1407, or S1408.

In step S1503, the control unit 205 determines whether the message to be processed is a print command. The print command is specified by the print command part 1308. If the message is not a print command (NO in step S1503), the processing proceeds to step S1504. If the message is a print command (YES in step S1503), the processing proceeds to step S1505.

In step S1504, the control unit 205 performs normal message processing. The content of the processing to be performed depends on the type of message. Since the message processing to be performed here is similar to normal JMF message processing, a description thereof will be omitted.

In step S1505, the control unit 205 obtains the JDF part specified by the JDF specification part 1309 of the target print command, and analyzes the JDF part. The analysis of the JDF part is similar to that described in step S601.

In step S1506, the control unit 205 generates a print job based on the result of the analysis of the JDF part in step S1505. The contents and print settings specified in the JDF part are associated with the print job. While generated print jobs are usually registered in a print job queue, the processing here proceeds to step S1507 without registering the print job in the print job queue in step S1506.

In step S1507, the control unit 205 determines whether the print job uses a sheet type specified by a sheet setting command. The control unit 205 determines that such a sheet type is used if the medium specified in the sheet setting command is directly referred to for specification as described with reference to FIG. 13C. If attributes or an ID is/are specified and a sheet tray is specified, the control unit 205 performs sheet feature determination processing similar to that of step S603. If both the sheet type and the sheet tray agree with those of the medium specified by the sheet setting command, the control unit 205 determines that the sheet type is used. If either or both of the sheet type and the sheet tray disagree or if no sheet tray is specified, the control unit 205 determines that the sheet type is not used. If a sheet type specified by a sheet setting command is used (YES in step S1507), the processing proceeds to step S1508. If not (NO in step S1507), the processing proceeds to step S1511.

In step S1508, the control unit 205 determines whether the sheet type determined to be used in step S1507 is included in ones determined to not be settable in step S1707 to be described below (see FIG. 17). If the sheet type is determined to be included (YES in step S1508), the processing proceeds to step S1512. If not (NO in step S1508), the processing proceeds to step S1509.

In step S1509, the control unit 205 associates the print job generated in step S1506 with a correspondence between sheet trays and sheet types, generated in step S1706 to be described below (see FIG. 17). The correspondence to be associated with is that between sheet trays and sheet types where the sheet type determined to be used in step S1507 is included. After the association, the control unit 205 records the result into the RAM 208. The processing proceeds to step S1510.

In step S1510, the control unit 205 determines the correspondence between sheet trays and sheet types with which the print job is associated in step S1509 includes that having the same sheet tray and different sheet types. If such a correspondence is included (YES in step S1510), the processing proceeds to step S1512. If not (NO in step S1510), the processing proceeds to step S1511.

In step S1511, the control unit 205 registers the print job generated in step S1506 into the print job queue. The print job queue controls execution order of accepted jobs. Print jobs are typically executed in the order of acceptance in succession as soon as resources are freed. In step S1512, the control unit 205 cancels the print job generated in step S1506.

In step S1513, the control unit 205 determines whether there is an unprocessed message to be immediately processed. If there is an unprocessed message to be immediately processed (YES in step S1513), the processing proceeds to step S1503. In step S1503, the control unit 205 processes the message. If there is no unprocessed message to be immediately processed (NO in step S1513), the flowchart ends.

<Flowchart of Preprocessing of Sheet Registration Commands to be Processed During Job>

Figure 16:
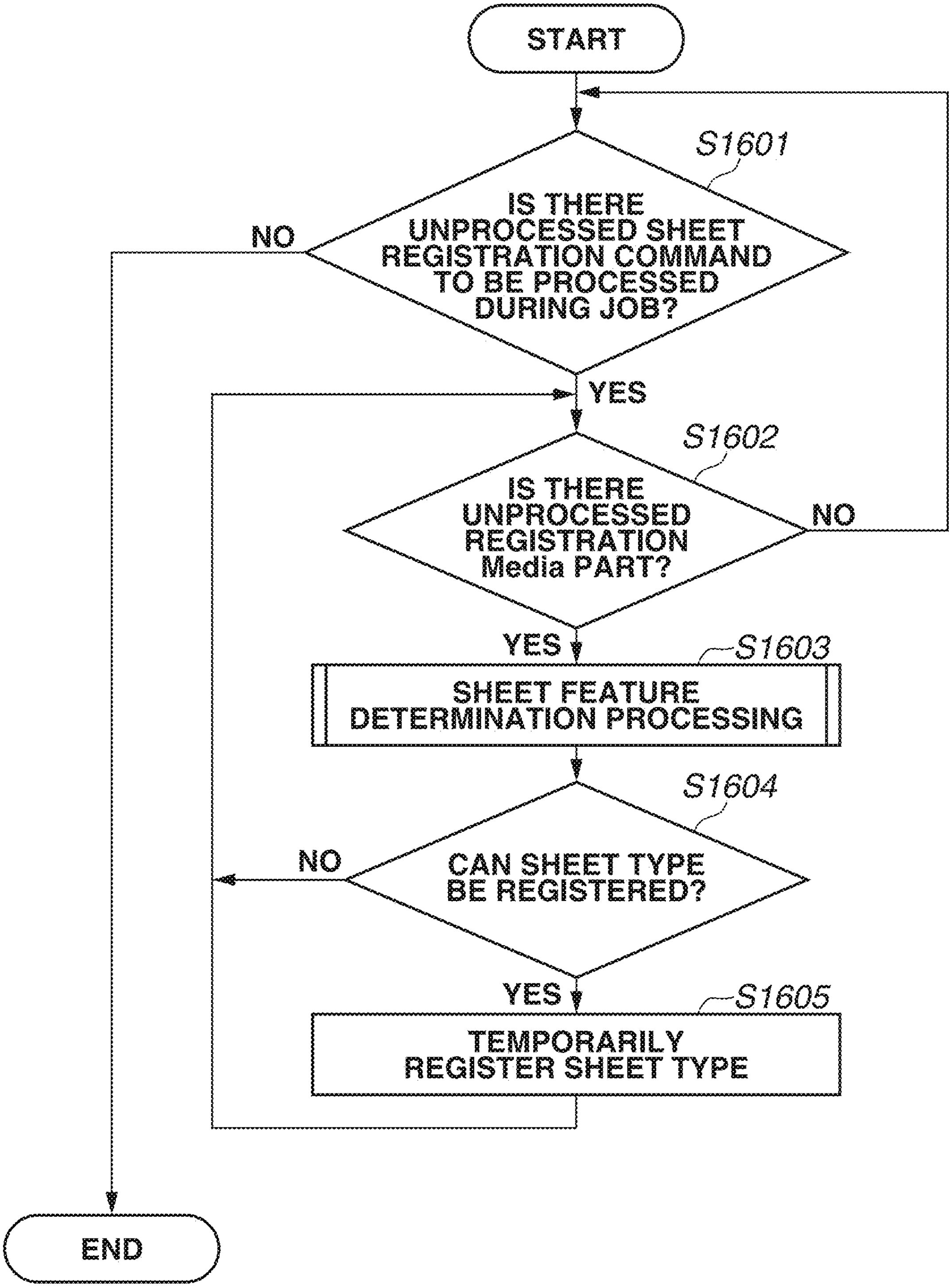
FIG. 16 is a flowchart for describing a processing procedure of preprocessing of sheet registration commands to be processed during a job.

FIG. 16 is a flowchart illustrating a processing procedure of the preprocessing of sheet registration commands to be processed during the job in step S1501.

In step S1601, the control unit 205 determines whether there is a sheet registration command yet to be subjected to the processing of step S1602 to S1605 among ones determined to be processed during the job in step S1407. If there is an unprocessed sheet registration command (YES in step S1601), the processing proceeds to step S1602. If there is no unprocessed sheet registration command (NO in step S1601), the flowchart ends.

In step S1602, the control unit 205 determines whether the sheet registration command part 1302 including the target sheet registration command includes an unprocessed registration Media part 1303. If there is an unprocessed registration Media part 1303 (YES in step S1602), the processing proceeds to step S1603. If there is no unprocessed registration Media part 1303 (NO in step S1602), the processing proceeds to step S1601.

In step S1603, the control unit 205 performs sheet feature determination processing. This processing is similar to that of step S603. After the sheet feature determination processing, the processing proceeds to step S1604.

In step S1604, the control unit 205 determines whether the sheet type can be registered in the sheet database. This processing is similar to that of step S607. If the sheet type is determined to be registrable (YES in step S1604), the processing proceeds to step S1605. If the sheet type is determined to not be registrable (NO in step S1604), the processing proceeds to step S1602.

In step S1605, the control unit 205 generates a sheet type having the sheet features determined in step S1603, and temporarily registers the sheet type in the sheet database. This processing is similar to that of step S608. After the temporary registration, the processing proceeds to step S1602.

By the preprocessing of sheet registration commands to be processed during the job, the sheet types specified by the sheet registration commands determined to be processed during the job are temporarily registered in the sheet database.

<Flowchart of Preprocessing of Sheet Setting Commands to be Processed During Job>

Figure 17:
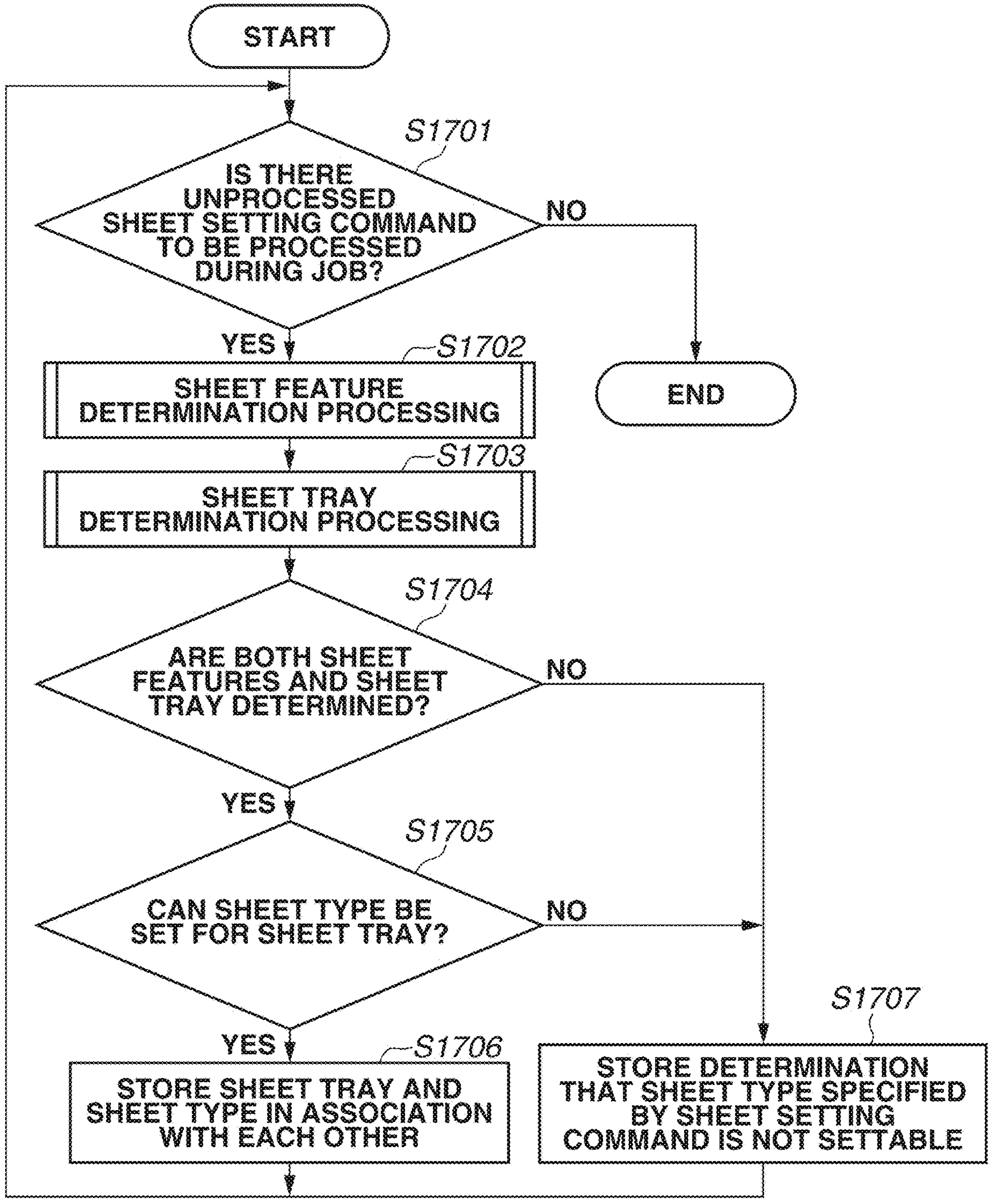
FIG. 17 is a flowchart for describing a processing procedure of preprocessing of sheet setting commands to be processed during a job.

FIG. 17 is a flowchart illustrating a processing procedure of the preprocessing of sheet setting commands to be processed during the job in step S1502.

In step S1701, the control unit 205 determines whether there is a sheet setting command yet to be subjected to the processing of steps S1702 to S1707 among ones determined to be processed during the job in step S1407 or S1408. If there is an unprocessed sheet setting command (YES in step S1701), the processing proceeds to step S1702. If there is no unprocessed sheet setting command (NO in step S1701), the flowchart ends.

In step S1702, the control unit 205 performs sheet feature determination processing. This processing is similar to that of step S603. If the sheet setting command refers to the registration Media part 1303 of the sheet registration command part 1302, step S1702 may be omitted and the sheet features may be regarded as having been determined. After the sheet feature determination processing, the processing proceeds to step S1703.

In step S1703, the control unit 205 performs sheet tray determination processing. This processing is similar to that of step S604. After the sheet tray determination processing, the processing proceeds to step S1704.

In step S1704, the control unit 205 determines whether the sheet features and the sheet tray are determined in steps S1702 and S1703. If either or neither is determined (NO in step S1704), the processing proceeds to step S1707. If both are determined (YES in step S1704), the processing proceeds to step S1705.

In step S1705, the control unit 205 determines whether the sheet type can be set for the sheet tray. Unlike step S610, the determination here is made based only on the capability information about the sheet tray. Since the present exemplary embodiment is not predicated on the completion of sheet replacement by the time when the job is submitted, the automatically detected size of sheets currently loaded in the sheet cassette is not used for the determination. Since all associations made in step S1706 are not necessarily used for the same print job, the presence of more than one sheet type associated with the same sheet tray does not lead to the determination that the sheet type is not settable for the sheet tray. Such a determination will be made in step S1510, and thus the presence or absence of more than one sheet type associated with the same sheet tray is not taken into account in making determination here. The determination using the capability information about the sheet tray has been described in step S610. If the sheet type is determined to be settable (YES in step S1705), the processing proceeds to step S1706. If the sheet type is determined to not be settable (NO in step S1705), the processing proceeds to step S1707.

In step S1706, the control unit 205 stores the sheet tray and the sheet type into the RAM 208 in association with each other. Unlike step S611, the association is stored with respect to each job accepted. If the accepted JDF data is permitted to refer to a Media part in the JMF data, the ID of the Media part can also be stored in association with the sheet tray and the sheet type. After the storage, the processing proceeds to step S1701.

In step S1707, the control unit 205 determines that the sheet type specified by the sheet setting command is not settable, and stores the determination in association with the sheet setting command. As described above, a print job using the sheet type determined to not be settable is canceled through the processing path from step S1508 to step S1512. After the storage, the processing proceeds to step S1701.

By performing the preprocessing of sheet setting commands to be processed during the job, associations are generated between the sheet types and the sheet trays specified by the sheet setting commands determined to be processed during the job.

<Flowchart of Job Execution Time Processing>

Figure 18:
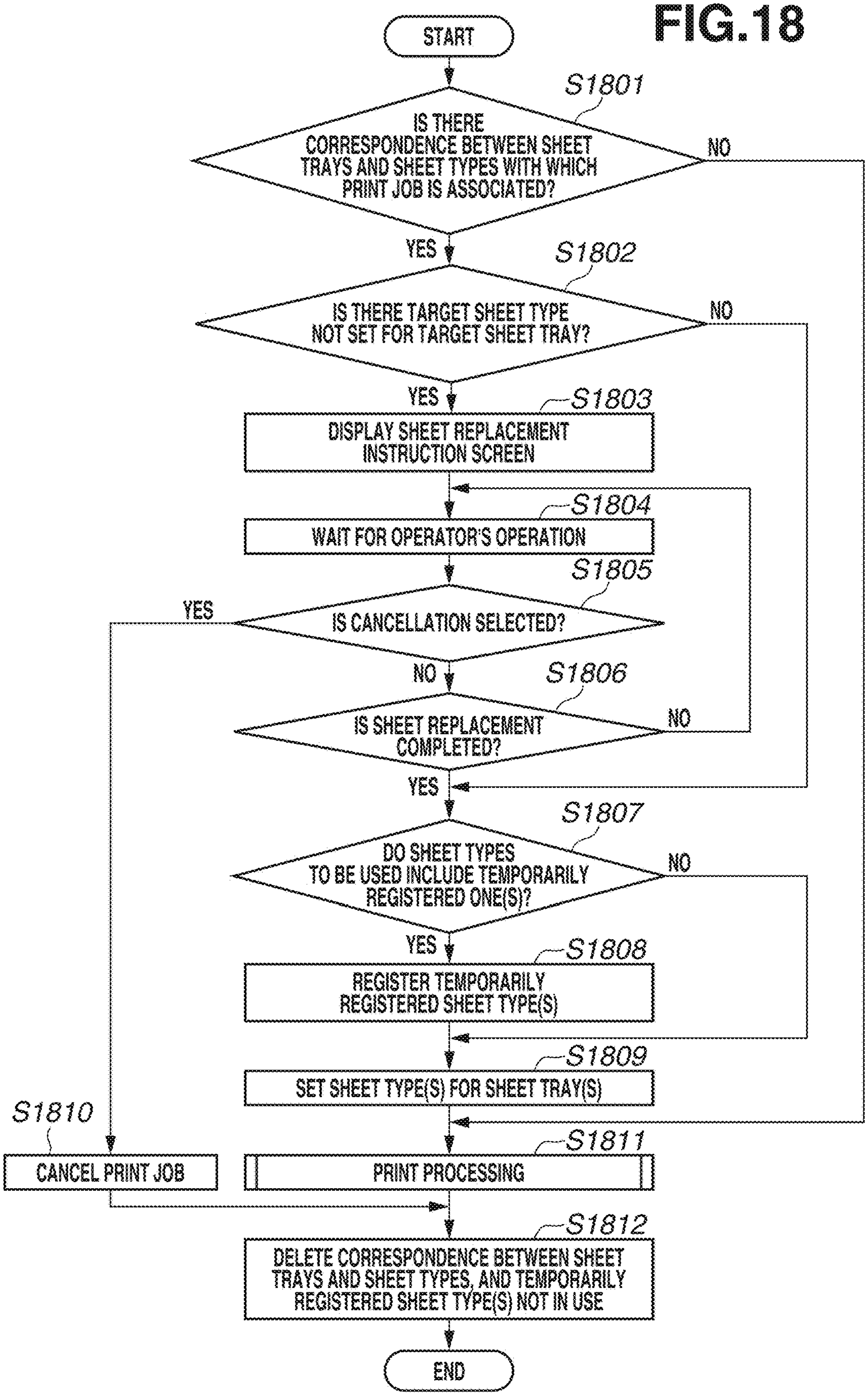
FIG. 18 is a flowchart for describing a procedure of job execution time processing.

FIG. 18 illustrates job execution time processing to be performed when the execution turn of the print job registered in the print job queue in step S1511 has come.

In step S1801, the control unit 205 refers to the print jobs associated with the correspondence generated between sheet trays and sheet types in step S1706, and determines whether there is a correspondence between sheet trays and sheet types with which the print job is associated with. If there is such a correspondence (YES in step S1801), the processing proceeds to step S1802. If not (NO in step S1801), the processing proceeds to step S1811.

In step S1802, the control unit 205 determines whether the correspondence between sheet trays and sheet types obtained in step S1801 includes a correspondence where a target sheet type is not set for a target sheet tray. If there is any unset sheet type (YES in step S1802), the control unit 205 stores such a sheet type or types and a sheet tray or trays into the RAM 208 and the processing proceeds to step S1803. If there is no unset sheet type (NO in step S1802), the processing proceeds to step S1807.

In step S1803, the control unit 205 displays a sheet replacement instruction screen 1900 on the operation unit 204. The sheet replacement instruction screen 1900 displays the sheet type and the sheet tray stored in step S1706. The sheet replacement instruction screen 1900 will be described below with reference to FIG. 19. After the display, the processing proceeds to step S1804.

In step S1804, the control unit 205 waits for the operator's operation. If an operation is accepted, the processing proceeds to step S1805.

In step S1805, the control unit 205 determines whether the accepted operation is one for selecting cancellation. The operation for selecting cancellation will be described below with reference to FIG. 19. If the accepted operation is one for selecting cancellation (YES in step S1805), the processing proceeds to step S1810. If not (NO in step S1805), the processing proceeds to step S1806.

In step S1806, the control unit 205 determines whether the accepted operation is one from which the operator is determined to have completed sheet replacement. Whether sheet replacement is completed can be determined by various methods. Two examples will be given. One is to check whether an OK button 1903 indicating that the replacement operation is done is selected. Another is to check whether all target sheet trays are opened and closed by the operator. If either of the operations is made (YES in step S1806), the processing proceeds to step S1807. If not (NO in step S1806), the processing proceeds to step S1804.

In step S1807, the control unit 205 determines whether the sheet types to be used in the print job include a temporarily registered one or ones. The temporarily registered sheet type(s) refers/refer to the one(s) temporarily registered in step S1605. If the sheet types to be used include a temporarily registered one(s) (YES in step S1807), the processing proceeds to step S1808. If not (NO in step S1807), the processing proceeds to step S1809.

In step S1808, the control unit 205 registers the sheet type(s) temporarily registered in step S608 and stored in the RAM 208 into the sheet database, and stores the sheet type(s) into the RAM 208 and the HDD 209. This processing is similar to that of step S613. After the registration, the processing proceeds to step S1809.

In step S1809, the control unit 205 sets the sheet type(s) for the sheet tray(s) stored in step S1802, if any, and stores the sheet type(s) into the HDD 209 and the RAM 208. After the setting, the processing proceeds to step S1811.

In step S1810, the control unit 205 cancels the print job and deletes the print job from the print job queue. After the cancellation of the print job, the processing proceeds to step S1812.

In step S1811, the control unit 205 prints (executes) the target print job. Since this print processing is similar to normal print processing, a detailed description thereof will be omitted. After the printing, information similar to that in the first exemplary embodiment may be returned. After the execution of the print job, the control unit 205 deletes the target print job from the print job queue. The processing then proceeds to step S1812.

In step S1812, the control unit 205 deletes the correspondence between the sheet trays and the sheet types that are associated only with the target print job. The control unit 205 also deletes the temporarily registered sheet type(s) not used in any of the print jobs in the print job queue. After the deletion, the flowchart ends.

Sheet types to be set for sheet trays are set immediately before the actual execution of a print job. In the foregoing operation, sheet types are described to be set for sheet trays immediately before the execution of each received job (print job). However, sheet types may be set for sheet trays immediately before the execution of a print job only if there is a preceding job or jobs in the print job queue, and the operation according to the first exemplary embodiment may be performed if there is no preceding job.

<Schematic Diagrams of Screens Displayed on Operation Unit>

Figure 19A:
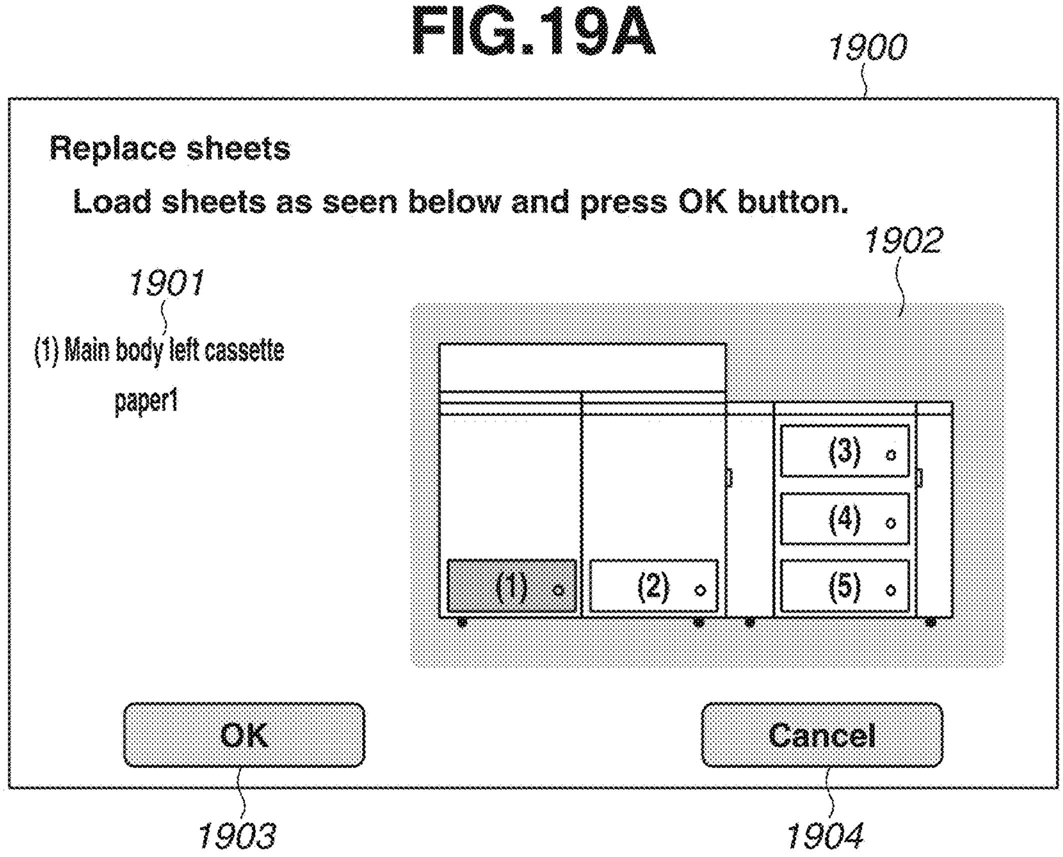
FIGS. 19A and 19B are schematic diagrams illustrating examples of a screen displayed on an operation unit.
Figure 19B:
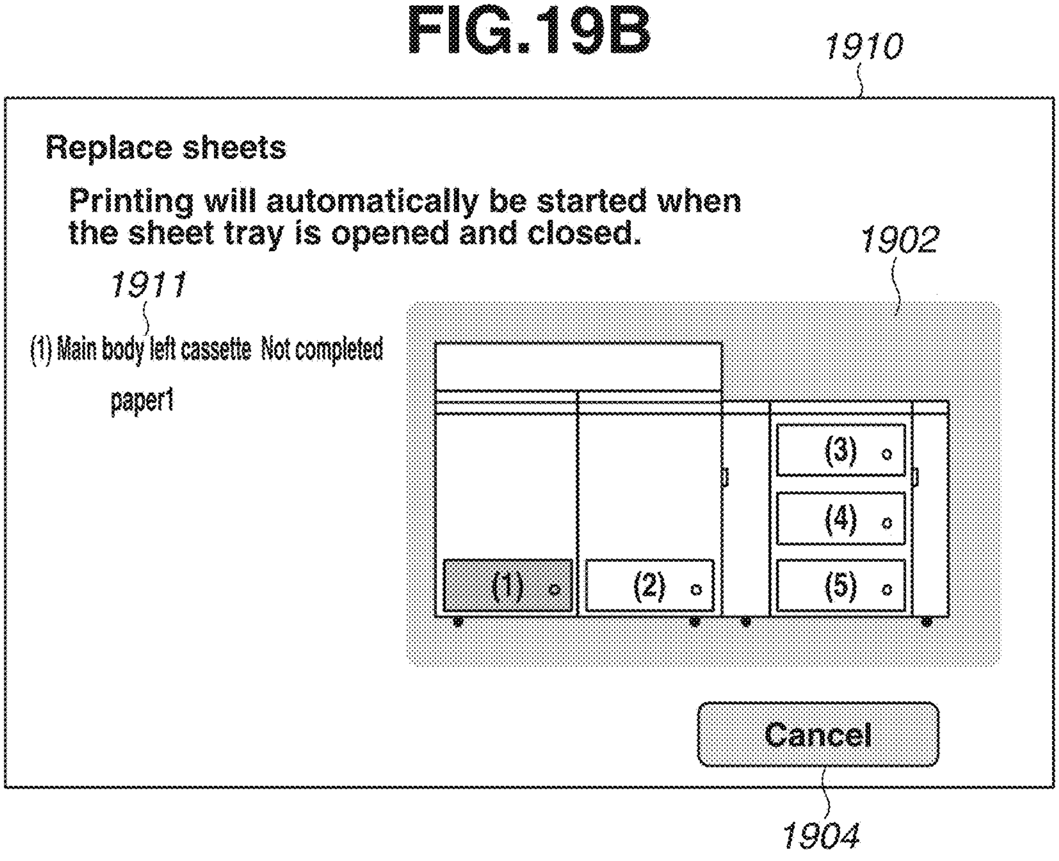

FIGS. 19A and 19B illustrate examples of the sheet replacement instruction screen 1900 displayed on the operation unit 204 in step S1803. Here, sheets are replaced if the target sheet tray is already loaded with other sheets, and simply loaded if the target sheet tray is empty. Moreover, while in the examples of FIGS. 19A and 19B the message “Replace sheets” is displayed on-screen, a message “Load sheets” may be displayed alternatively.

FIG. 19A illustrates the sheet replacement instruction screen 1900 displayed on the operation unit 204 if the operation from which the operator is determined to have followed the sheet replacement instructions in step S1806 is the selection of an OK button 1903.

A set sheet tray and sheet type display section 1901 is an area for displaying the sheet tray(s) and sheet type(s) that are determined to be associated with this job in step S1801 and determined to be such that the sheet type(s) is/are not set for the sheet tray(s) in step S1802. All the sheet tray(s) and sheet type(s) determined so are displayed.

A set sheet tray display section 1902 is an area for providing an easily understandable graphical representation of where the sheet tray(s) displayed in the set sheet tray and sheet type display section 1901 is/are in the image forming apparatus 101.

The OK button 1903 is a button for notifying that replacement has been completed according to the sheet replacement instructions. If the OK button 1903 is selected, the processing proceeds from step S1806 to step S1807.

A cancel button 1904 is a button for giving an instruction to abort the print job. If the cancel button 1904 is selected, the control unit 205 hides the sheet replacement instruction screen 1900, and the processing proceeds from step S1805 to step S1810.

FIG. 19B illustrates a second sheet replacement instruction screen 1910 displayed on the operation unit 204 if the operation from which the operator is determined to have completed sheet replacement in step S1806 is the opening and closing of all the target sheet feed unit(s) 223.

A second set sheet tray and sheet type display section 1911 is a display area having a similar function to that of the set sheet tray and sheet type display section 1901. The second set sheet tray and sheet type display section 1911 desirably displays in an operator-understandable manner whether the sheet feed unit(s) 223 corresponding to the sheet tray(s) has/have been opened and closed. In the illustrated example, the “main body left cassette” has not been opened or closed and is thus displayed as “Not completed”. The display is changed to “completed” when the opening and closing operation is detected by an opening and closing detection function of the sheet feed unit 223. If the opening and closing of the sheet feed unit(s) 223 corresponding to all the target sheet tray(s) is detected, the control unit 205 hides the second sheet replacement instruction screen 1910. The processing proceeds from step S1806 to step S1807.

Figures 20A, 20B:
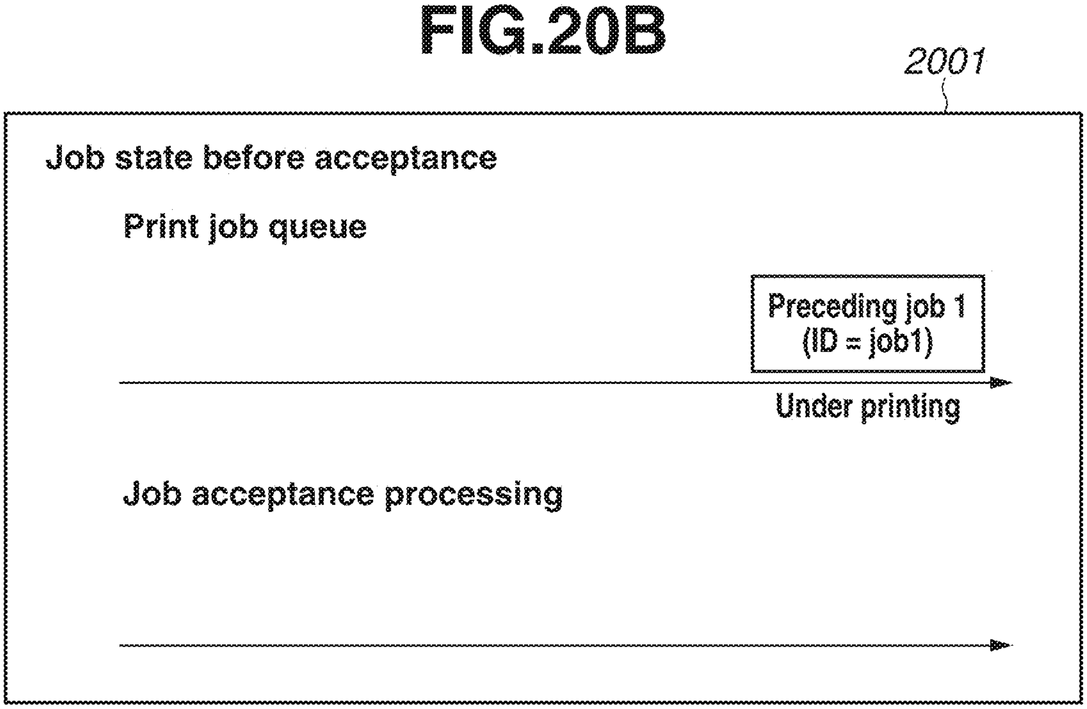
FIGS. 20A to 20Q are schematic diagrams for describing an operation according to the second exemplary embodiment.
Figures 20H, 20I:
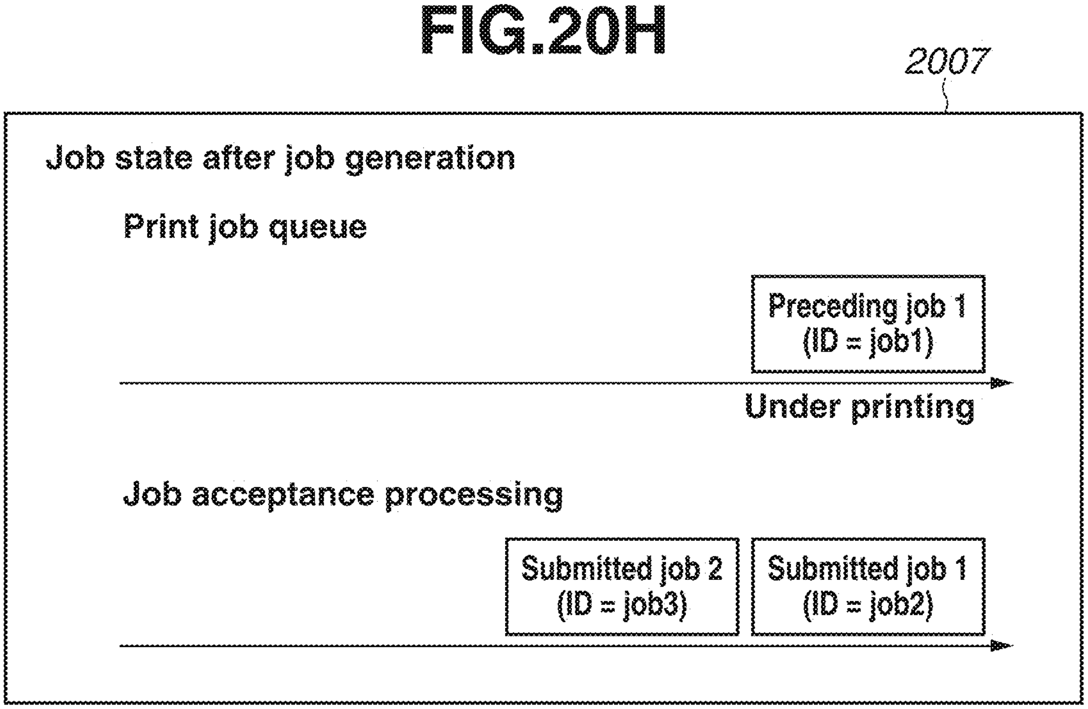
Figure 20J:
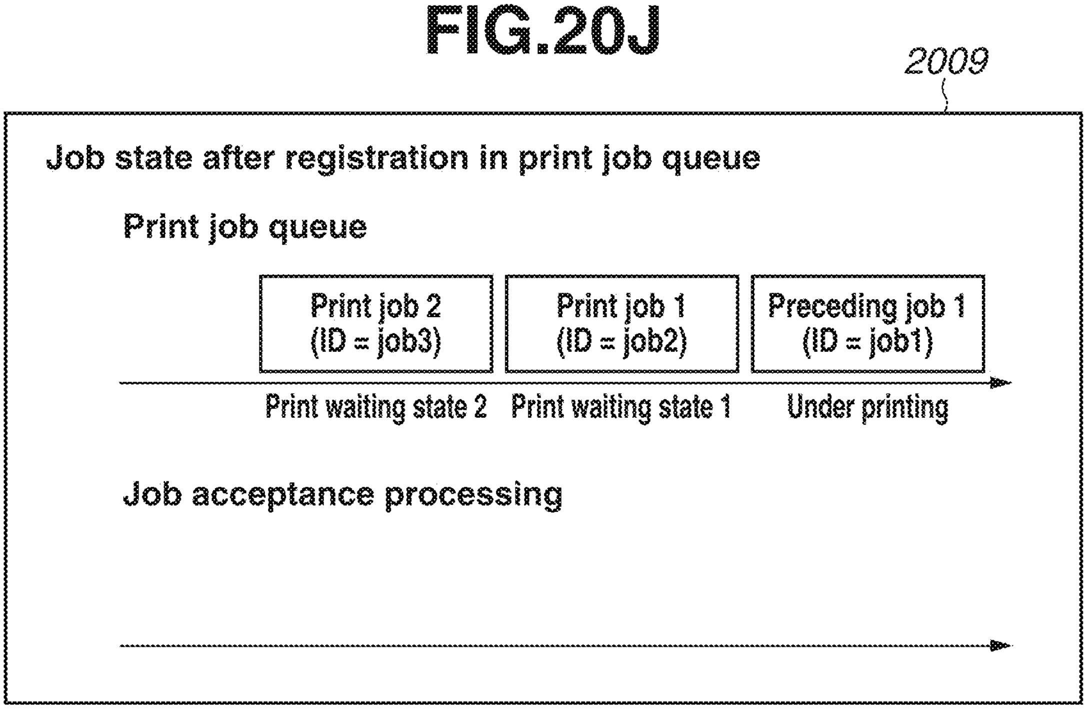
Figure 20K:
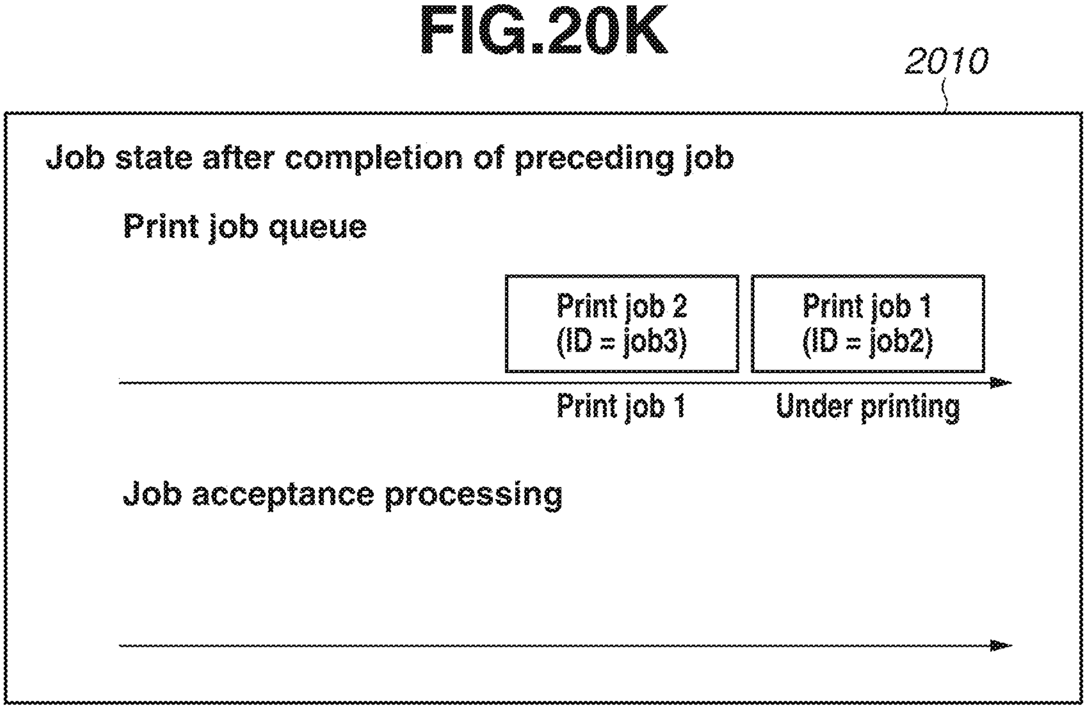
Figures 20P, 20Q:
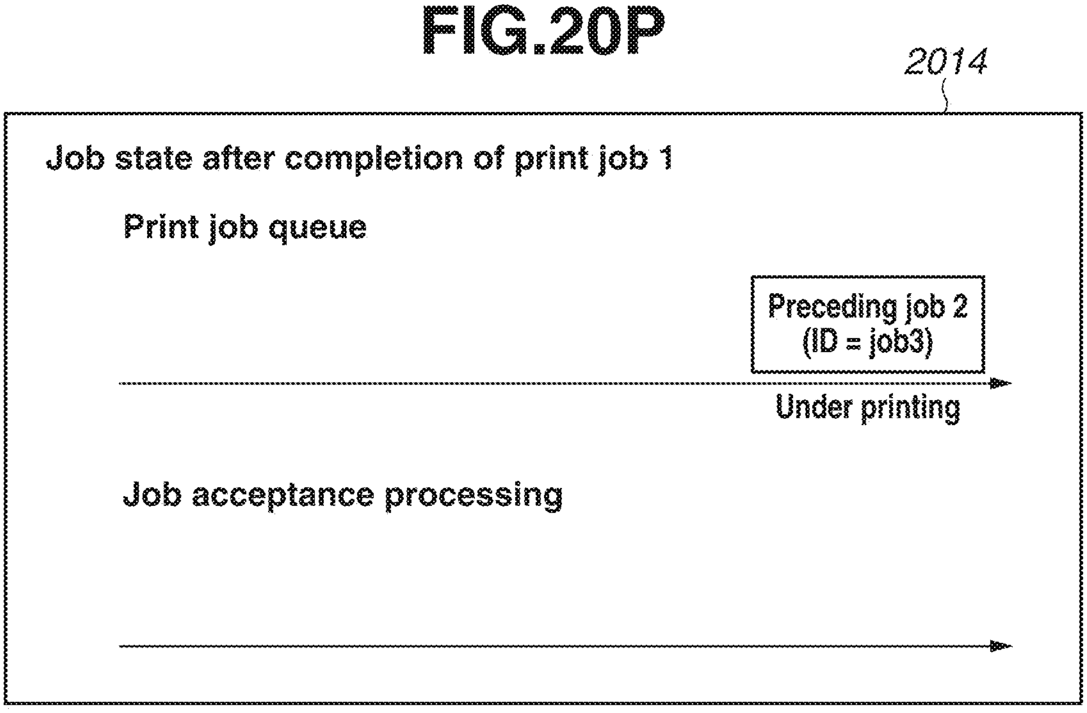

Schematic Diagrams for Describing Processing Procedure According to Second Exemplary Embodiment FIGS. 20A to 20Q are schematic diagrams for describing a processing procedure according to the present exemplary embodiment. Only characteristic portions of the second exemplary embodiment will now be described, and similar portions to those of the first exemplary embodiment will be omitted.

Suppose that the sheet database before process execution are the same as in FIG. 12A. In the second exemplary embodiment, sheets do not need to be replaced before the submission of a print job. The sheet settings and the sheets actually loaded in the sheet trays are therefore the same. FIG. 20A illustrates the sheet tray settings and in-tray sheets before process execution.

FIG. 20B illustrates a job state before acceptance 2001. FIG. 20B illustrates the state of the print job queue before the acceptance of jobs to be described below and the state of a job acceptance processing process. The print job queue includes preceding job 1 that is a job already under printing. Suppose that preceding job 1 includes no specification for sheet settings.

FIG. 20C illustrates JMF and JDF contents of the jobs to be accepted. JMF/JDF specifications 2002 of submitted job 1 illustrate the contents of the job to be accepted ahead.

JMF/JDF specifications 2003 of submitted job 2 illustrate the contents of the job to be accepted next.

When submitted jobs 1 and 2 are accepted, the processing in accepting a received job illustrated in FIG. 14 is performed each time. Suppose that both submitted jobs 1 and 2 are determined, in step S1407, to include sheet setting and sheet registration commands to be processed during the job and a print command to be immediately processed.

In step S1501, submitted job 1 is subjected to the preprocessing of sheet registration commands to be processed during the job. In step S1603, the sheet feature determination processing is performed on the sheet type specified by the sheet registration command with an "ID" attribute of "MEDIA_004". The determination result here is the same as with an "ID" attribute of "MEDIA_004" in FIG. 12D. In step S1605, the sheet type is temporarily registered. The result of the temporary registration is the same as that illustrated in FIG. 12E.

In step S1502, submitted job 1 is subjected to the preprocessing of sheet setting commands to be processed during the job. In step S1702, the sheet feature determination processing is performed on the sheet type specified by the sheet setting command with an "ID" attribute of "MEDIA_001". The determination result here is the same as that with an "ID" attribute of "MEDIA_001" illustrated in FIG. 12D. In step S1703, the sheet tray determination processing is performed on each sheet setting command. The determination result here is the same as that illustrated in FIG. 12D.

In step S1706, the control unit 205 stores the sheet trays and the sheet types in association with each other. Here, to permit the JDF data to make reference to a Media part in the JMF data, the attribute values of the "ID" attributes of the Media parts are also stored in association. FIG. 20D illustrates the result of the associations here.

FIG. 20E similarly illustrates the result of temporary registration of submitted job 2 in step S1605. FIG. 20F illustrates the results of the sheet feature determination processing in steps S1603 and S1702 and the sheet tray determination processing of step S1703. FIG. 20G illustrates the result of the associations made between the sheet trays and the sheet types in step S1706.

FIG. 20H illustrates a job state when print jobs are generated for submitted jobs 1 and 2 in step S1506. The generated print jobs 1 and 2 are given IDs of "job2" and "job3", respectively.

FIG. 20I illustrates the result of the associations made and stored in step S1509 of print jobs 1 and 2 with the correspondence between the sheet trays and sheet types. Of the sheet types specified by the sheet setting commands of print job 1, the ones with "ID" attributes of "MEDIA_001" and "MEDIA_004" are determined to be used in step S1507. As for print job 2, only the sheet type with an "ID" attribute of "MEDIA_006" is determined to be used in step S1507. Associating the IDs assigned to the print jobs with the correspondence between the sheet trays and the sheet types provides a result of associations 2008 of the print jobs with the sheet trays and the sheet types.

In step S1511, print jobs 1 and 2 generated for submitted jobs 1 and 2 in steps S1506 are registered in the print job queue. FIG. 20J illustrates the state of the print job queue after the registration in the print job queue. Print jobs 1 and 2 are in a print waiting state.

After the completion of the printing of preceding job 1, the control unit 205 performs the job execution time processing on print job 1. FIG. 20K illustrates a job state 2010 here after the completion of preceding job 1.

In step S1801, starting the job execution time processing on print job 1, the control unit 205 refers to the result of associations 2008 of the print jobs with the sheet trays and the sheet types. Since print job 1 with an ID of "job2" is associated with the correspondence between the sheet feed deck upper stage 223*c* and the sheet type having the name "KHAD2" and the ID "3", the processing proceeds from step S1801 to step S1802. In step S1802, the control unit 205 refers to the sheet settings of FIG. 20A, where the main body left cassette 223*a* is associated with the sheet type having the name "MJTR1" and the ID "1", and the sheet feed deck upper stage 223*c* is associated with the sheet type having the name "MJTR1" and the ID "1". The control unit 205 thus determines that the sheet types do not match the associations, and the processing proceeds to step S1803. In step S1803, the control unit 205 displays the sheet replacement instruction screen 1900. The set sheet tray and sheet type display section 1901 displays "(1) Main body left cassette" and "Film1", and "(3) Sheet feed deck upper stage" and "KHAD2". In step S1806, if the OK button 1903 is selected, the processing proceeds to step S1807. Since the sheet type having the name "Film1" and the ID "5" is a temporarily registered one, the processing proceeds from step S1807 to step S1808 for sheet type registration. FIG. 20L illustrates the state of the sheet database after the registration of the sheet types of print job 1. In step S1809, the control unit 205 sets the sheet types for the sheet trays. Since the sheets have been replaced by the operator based on the instructions displayed on the sheet replacement instruction screen 1900, both the sheets in the sheet trays and the sheet types set for the sheet trays are the same as specified in print job 1. FIG. 20M illustrates the correspondence between the sheet tray settings and the sheets in the sheet trays after the setting. In step S1812, the correspondence between the sheet trays and the sheet types associated with print job 1 is deleted. FIG. 20N illustrates associations 2012 of print jobs with sheet trays and sheet types after the completion of print job 1. In step S1812, temporarily registered sheet types not used in any of the submitted print jobs are also deleted. The sheet type with the name "Cotton1" is not used in print job 2 and thus deleted. FIG. 20O illustrates the resulting state of the sheet database.

Similarly, after the completion of printing of print job 1, the control unit 205 performs the job execution time processing on print job 2. FIG. 20P illustrates a job state 2014 here after the completion of print job 1.

In step S1801, the control unit 205 refers to the result of associations 2012 of print jobs with sheet trays and sheet types. In step S1803, "(3) Sheet feed deck upper stage" and "MJTR1" are displayed in the set sheet tray and sheet type display section 1901. Since none of the sheet types used in print job 2 is temporarily registered, the processing proceeds from step S1807 to step S1809. In step S1809, the control unit 205 sets the sheet type having the name "MJTR1" for the sheet feed deck upper stage 223*c*. FIG. 20Q illustrates the correspondence between the sheet tray settings and the sheets in the sheet trays after the setting. In step S1812, the correspondence between the sheet tray and the sheet type associated with print job 2 is deleted. This makes the job association column of FIG. 20N empty. Temporarily registered sheet types are not deleted since there is none.

According to the present exemplary embodiment, sheet settings are automatically made for sheet trays and printing is performed by simply loading sheets to be used into the sheet trays at timing when a print job is executed. Unlike the first exemplary embodiment, the sheets do not need to be replaced in advance at the timing of transmission of the print job, and can be simply replaced based on instructions displayed at the timing of execution of the print job.

According to the exemplary embodiments described above, the types of sheets in the sheet feed units 223 can be set for the image forming apparatus 101 by using sheet specifications in a print job. Even in executing printing that involves sheet replacement, the operator can simply load the sheets into the sheet trays and submit the job, and no operation for notifying the image forming apparatus 101 of the sheet settings is needed. This can reduce the operator's labor as to the sheet settings of the sheet feed units 223 and prevent the occurrence of setting mistakes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-125692, filed Jul. 22, 2020, which is hereby incorporated by reference herein in its entirety.

What is claimed is:

1. An image forming apparatus comprising:

at least one processor and at least one memory coupled to each other and to perform operations including:

receiving, from an external apparatus, a print job including a print command, determining whether the print job includes a setting instruction to set a specified sheet type to a specified sheet feed unit, determining, in a case where it is determined that the print job includes the setting instruction to set the specified sheet type to the specified sheet feed unit, whether setting of the specified sheet type to the specified sheet feed unit in the setting instruction is possible, not performing, in a case where it is determined that the setting of the specified sheet type to the specified sheet feed unit in the setting instruction is not possible, printing based on the print command including the print job, sorting, in a case where it is determined that the print job includes the setting instruction to set the specified sheet type to the specified sheet feed unit and that the setting of the specified sheet type to the specified sheet feed unit in the setting instruction is possible, information in which the specified sheet feed unit of the image forming apparatus is associated with the specified sheet type based on the setting instruction, and performing the printing based on the print command included in the print job, and performing, in a case where it is determined that the print job does not include the setting instruction to set the specified sheet type to the specified sheet feed unit, the printing based on the print command included in the print job with the information in which a sheet feed unit of the image forming apparatus is associated with a sheet type based on the setting instruction not being stored.

2. The image forming apparatus according to claim 1, wherein the operations further include setting the specified sheet type to the specified sheet feed unit before performing the printing based on the print command included in the print job.

3. The image forming apparatus according to claim 1, wherein the print job includes the setting instruction to set the specified sheet type to the specified sheet feed unit, a registration command for registering the specified sheet type in a sheet database, and the print command.

4. A method for controlling an image forming apparatus, the method comprising:

receiving, from an external apparatus, a print job including a print command;

determining whether the print job includes a setting instruction to set a specified sheet type to a specified sheet feed unit;

determining, in a case where it is determined that the print job includes the setting instruction to set the specified sheet type to the specified sheet feed unit, whether setting of the specified sheet type to the specified sheet feed unit in the setting instruction is possible;

not performing, in a case where it is determined that the setting of the specified sheet type to the specified sheet feed unit in the setting instruction is not possible, printing based on the print command including the print job;

sorting, in a case where it is determined that the print job includes the setting instruction to set the specified sheet type to the specified sheet feed unit and that the setting of the specified sheet type to the specified sheet feed unit in the setting instruction is possible, information in which the specified sheet feed unit of the image forming apparatus is associated with the specified sheet type based on the setting instruction, and performing the printing based on the print command included in the print job; and performing, in a case where it is determined that the print job does not include the setting instruction to set the specified sheet type to the specified sheet feed unit, the printing based on the print command included in the print job with the information in which a sheet feed unit of the image forming apparatus is associated with a sheet type based on the setting instruction not being stored.

5. The method according to claim 4, wherein the operations further include setting the specified sheet type to the specified sheet feed unit before performing the printing based on the print command included in the print job.

6. The method according to claim 4, wherein the print job includes the setting instruction to set the specified sheet type to the specified sheet feed unit, a registration command for registering the specified sheet type in a sheet database, and the print command.

* * * * *